(12) United States Patent
Park et al.

(10) Patent No.: US 11,093,505 B2
(45) Date of Patent: Aug. 17, 2021

(54) REAL-TIME BUSINESS EVENT ANALYSIS AND MONITORING

(71) Applicant: Oracle International Corporation, Redwood Shores, CA (US)

(72) Inventors: Hoyong Park, San Jose, CA (US); Anand Srinivasan, Bangalore (IN); Roger Bolsius, Round Rock, TX (US); Eric Hsiao, San Mateo, CA (US); Jeffrey Toillion, Half Moon Bay, CA (US); Vikram Shukla, Fremont, CA (US)

(73) Assignee: Oracle International Corporation, Redwood, CA (US)

( * ) Notice: Subject to any disclaimer, the term of this patent is extended or adjusted under 35 U.S.C. 154(b) by 276 days.

(21) Appl. No.: 13/830,378

(22) Filed: Mar. 14, 2013

(65) Prior Publication Data

US 2014/0095537 A1  Apr. 3, 2014

Related U.S. Application Data

(60) Provisional application No. 61/707,641, filed on Sep. 28, 2012.

(51) Int. Cl.
*G06F 16/20* (2019.01)
*G06F 16/30* (2019.01)
(Continued)

(52) U.S. Cl.
CPC ... *G06F 16/24568* (2019.01); *B29D 30/0681* (2013.01); *B60C 1/0008* (2013.01);
(Continued)

(58) Field of Classification Search
CPC .............. G06F 17/30; G06F 17/30516; G06F 16/24568; G06F 16/9024; G06F 16/2474;
(Continued)

(56) References Cited

U.S. PATENT DOCUMENTS

| 4,996,687 A | 2/1991 | Hess et al. |
| 5,051,947 A | 9/1991 | Messenger et al. |

(Continued)

FOREIGN PATENT DOCUMENTS

| CN | 101866353 | 10/2010 |
| CN | 102135984 | 7/2011 |

(Continued)

OTHER PUBLICATIONS

SQL Tutorial-In, Tizag.com, http://web.archive.org/web/20090216215219/http://www.tizag.com/sgiTutorial/sqlin.php, Feb. 16, 2009, pp. 1-3.

(Continued)

*Primary Examiner* — Kristopher Andersen
*Assistant Examiner* — James E Heffern
(74) *Attorney, Agent, or Firm* — Kilpatrick Townsend & Stockton LLP

(57) ABSTRACT

Techniques for managing real-time business event analysis and monitoring are provided. In some examples, a logical request may be received at a business intelligence server configured with a continuous query service. Additionally, the continuous query service may be configured to translate the logical request into a physical request. Further, business intelligence information may be provided based at least in part on querying against an event data stream with a continuous query configured based at least in part on the physical request translated by the continuous query service.

20 Claims, 11 Drawing Sheets

(51) Int. Cl.
    *G06F 16/90* (2019.01)
    *B60C 1/00* (2006.01)
    *G06F 16/2455* (2019.01)
    *G06F 16/25* (2019.01)
    *G06F 16/242* (2019.01)
    *G06F 16/245* (2019.01)
    *G06F 16/248* (2019.01)
    *G06F 16/31* (2019.01)
    *G06F 16/951* (2019.01)
    *G06F 16/2453* (2019.01)
    *G06F 16/2458* (2019.01)
    *G06F 16/901* (2019.01)
    *B29D 30/06* (2006.01)
    *B29D 30/00* (2006.01)
    *B32B 27/00* (2006.01)
    *B60C 5/10* (2006.01)
    *B32B 27/08* (2006.01)
    *B32B 27/34* (2006.01)
    *B60C 5/14* (2006.01)

(52) U.S. Cl.
    CPC .......... *G06F 16/242* (2019.01); *G06F 16/245* (2019.01); *G06F 16/248* (2019.01); *G06F 16/2453* (2019.01); *G06F 16/2455* (2019.01); *G06F 16/2456* (2019.01); *G06F 16/2474* (2019.01); *G06F 16/2477* (2019.01); *G06F 16/24535* (2019.01); *G06F 16/24539* (2019.01); *G06F 16/24553* (2019.01); *G06F 16/25* (2019.01); *G06F 16/313* (2019.01); *G06F 16/9024* (2019.01); *G06F 16/951* (2019.01); *B29D 2030/0682* (2013.01); *B32B 27/08* (2013.01); *B32B 27/34* (2013.01); *B60C 5/14* (2013.01)

(58) Field of Classification Search
    CPC .......... G06F 16/24553; G06F 16/2477; G06F 16/24535; G06F 16/24539; G06F 16/25; G06F 16/242; G06F 16/245; G06F 16/248; G06F 16/313; G06F 16/951; G06F 16/2453; G06F 16/2455; G06F 16/2456; B60C 1/0008
    See application file for complete search history.

(56) References Cited

U.S. PATENT DOCUMENTS

| | | |
|---|---|---|
| 5,339,392 A | 8/1994 | Risberg et al. |
| 5,495,600 A | 2/1996 | Terry et al. |
| 5,691,917 A | 11/1997 | Harrison |
| 5,706,494 A | 1/1998 | Cochrane et al. |
| 5,802,262 A | 9/1998 | Van De |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | MacDonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,954,791 B2 | 10/2005 | Darby |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,139,977 B1 | 11/2006 | Russell |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,263,464 B1 | 8/2007 | Dugger |
| 7,284,041 B2 | 10/2007 | Nakatani et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |

(56) References Cited

U.S. PATENT DOCUMENTS

| | | |
|---|---|---|
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,112,378 B2 | 2/2012 | Kudo et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,332,502 B1 | 12/2012 | Neuhaus et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,038 B2 | 4/2014 | Cohen et al. |
| 8,713,049 B2 | 4/2014 | Jain et al. |
| 8,719,207 B2 | 5/2014 | Ratnam et al. |
| 8,738,572 B2 | 5/2014 | Bird et al. |
| 8,745,070 B2 | 6/2014 | Krisnamurthy |
| 8,762,369 B2 | 6/2014 | MacHo et al. |
| 8,775,412 B2 | 7/2014 | Day et al. |
| 8,880,493 B2 | 11/2014 | Chen et al. |
| 9,015,102 B2 | 4/2015 | Van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 | 3/2016 | Park et al. |
| 9,292,574 B2 | 3/2016 | Hsiao et al. |
| 9,298,854 B2 | 3/2016 | Ikawa et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 | 1/2017 | Park et al. |
| 9,563,663 B2 | 2/2017 | Shukla et al. |
| 9,703,836 B2 | 7/2017 | Hsiao et al. |
| 9,712,645 B2 | 7/2017 | de Castro Alves et al. |
| 9,715,529 B2 | 7/2017 | Park et al. |
| 9,756,104 B2 | 9/2017 | Shukla et al. |
| 9,804,892 B2 | 10/2017 | Park et al. |
| 9,805,095 B2 | 10/2017 | Deshmukh et al. |
| 9,852,186 B2 | 12/2017 | Herwadkar et al. |
| 9,886,486 B2 | 2/2018 | De Castro Alves et al. |
| 9,934,279 B2 | 4/2018 | Kali et al. |
| 9,946,756 B2 | 4/2018 | Hsiao et al. |
| 9,953,059 B2 | 4/2018 | Deshmukh et al. |
| 9,972,103 B2 | 5/2018 | De Castro Alves et al. |
| 9,990,401 B2 | 6/2018 | Toillion et al. |
| 9,990,402 B2 | 6/2018 | Srinivasan et al. |
| 10,025,825 B2 | 7/2018 | Deshmukh et al. |
| 10,042,890 B2 | 8/2018 | Hsiao et al. |
| 10,083,210 B2 | 9/2018 | De Castro Alves et al. |
| 10,102,250 B2 | 10/2018 | Deshmukh et al. |
| 10,120,907 B2 | 11/2018 | de Castro Alves et al. |
| 2002/0023211 A1 | 2/2002 | Roth et al. |
| 2002/0032804 A1 | 3/2002 | Hunt |
| 2002/0038217 A1* | 3/2002 | Young ............ G06Q 10/063114 705/7.15 |
| 2002/0038306 A1 | 3/2002 | Griffin et al. |
| 2002/0038313 A1 | 3/2002 | Klein et al. |
| 2002/0049788 A1 | 4/2002 | Lipkin |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |

(56) References Cited

U.S. PATENT DOCUMENTS

| | | |
|---|---|---|
| 2004/0024773 A1 | 2/2004 | Stoffel et al. |
| 2004/0030421 A1* | 2/2004 | Haley .................. G06F 8/10 700/49 |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 | 2/2005 | Collet et al. |
| 2005/0055338 A1 | 3/2005 | Warner et al. |
| 2005/0065949 A1 | 3/2005 | Warner et al. |
| 2005/0071217 A1* | 3/2005 | Hoogs ................ G06Q 10/0635 705/7.28 |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1 | 7/2006 | Jones |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0168154 A1 | 7/2007 | Ericson |
| 2007/0192301 A1 | 8/2007 | Posner |
| 2007/0198479 A1 | 8/2007 | Cai et al. |
| 2007/0022092 A1 | 9/2007 | Nishizawa et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0250487 A1 | 10/2007 | Reuther |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | Mcgoveran |
| 2008/0016095 A1 | 1/2008 | Bhatnagar et al. |
| 2008/0028095 A1* | 1/2008 | Lang et al. .................. 709/232 |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0098370 A1 | 4/2008 | Fontoura et al. |
| 2008/0110397 A1 | 5/2008 | Son |
| 2008/0114787 A1 | 5/2008 | Kashiyama et al. |
| 2008/0115103 A1* | 5/2008 | Datars ................ G06Q 10/10 717/101 |
| 2008/0120283 A1 | 5/2008 | Liu et al. |
| 2008/0120321 A1 | 5/2008 | Liu et al. |
| 2008/0162583 A1* | 7/2008 | Brown et al. ................ 707/200 |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | Mcwilliams et al. |
| 2008/0313131 A1 | 12/2008 | Friedman et al. |
| 2009/0006320 A1 | 1/2009 | Ding et al. |
| 2009/0006346 A1 | 1/2009 | Kanthi et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112809 A1 | 4/2009 | Wolff et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |

(56) References Cited

U.S. PATENT DOCUMENTS

| | | |
|---|---|---|
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0228465 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0292979 A1 | 11/2009 | Aggarwal |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishikawa |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016123 A1* | 1/2011 | Pandey ............. G06F 17/30348 |
| 2011/0016160 A1* | 1/2011 | Zhang ............. G06F 17/30386 707/805 |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1 | 2/2011 | Mason et al. |
| 2011/0040746 A1 | 2/2011 | Handa et al. |
| 2011/0040827 A1 | 2/2011 | Katsunuma et al. |
| 2011/0055192 A1 | 3/2011 | Tang et al. |
| 2011/0055197 A1 | 3/2011 | Chavan |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0213802 A1 | 9/2011 | Singh et al. |
| 2011/0246445 A1 | 10/2011 | Mishra et al. |
| 2011/0270879 A1 | 11/2011 | Srinivasan et al. |
| 2011/0282812 A1 | 11/2011 | Chandramouli et al. |
| 2011/0295841 A1 | 12/2011 | Sityon et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1* | 1/2012 | Dunagan ............. H04L 67/327 707/718 |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1* | 6/2012 | Cammert et al. ............. 707/718 |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0323941 A1 | 12/2012 | Chkodrov et al. |
| 2012/0324453 A1 | 12/2012 | Chandramouli et al. |
| 2013/0007539 A1 | 1/2013 | Ananthapadmanabh et al. |
| 2013/0014088 A1 | 1/2013 | Park et al. |
| 2013/0031567 A1 | 1/2013 | Nano et al. |
| 2013/0046725 A1* | 2/2013 | Cammert et al. ............. 706/52 |
| 2013/0066855 A1 | 3/2013 | Gupta et al. |
| 2013/0117317 A1 | 5/2013 | Wolf |
| 2013/0132108 A1* | 5/2013 | Solilov ............. G06Q 10/06 705/2 |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0237487 A1 | 8/2014 | Prasanna et al. |
| 2014/0324530 A1 | 10/2014 | Thompson et al. |
| 2014/0358959 A1 | 12/2014 | Bishnoi et al. |
| 2014/0379712 A1 | 12/2014 | Lafuente Alvarez |

(56) References Cited

U.S. PATENT DOCUMENTS

| | | |
|---|---|---|
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0127517 A1 | 5/2016 | Shcherbakov et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1 | 1/2017 | De Castro Alves et al. |
| 2017/0075726 A1 | 3/2017 | Park et al. |
| 2018/0046511 A1 | 2/2018 | Park et al. |
| 2018/0181622 A1 | 6/2018 | Deshmukh et al. |
| 2018/0186183 A1 | 7/2018 | Hsiao et al. |
| 2018/0218522 A1 | 8/2018 | De Castro Alves et al. |
| 2018/0246935 A1 | 8/2018 | Toillion et al. |
| 2018/0246936 A1 | 8/2018 | Srinivasan et al. |

FOREIGN PATENT DOCUMENTS

| | | |
|---|---|---|
| CN | 102665207 | 9/2012 |
| CN | 102892073 | 1/2013 |
| CN | 104885077 | 9/2015 |
| CN | 104937591 | 9/2015 |
| CN | 105074698 | 11/2015 |
| CN | 105308592 | 2/2016 |
| CN | 105379183 | 3/2016 |
| CN | 105593854 | 5/2016 |
| EP | 1 241 589 A2 | 9/2002 |
| EP | 2474922 | 7/2012 |
| EP | 2946314 | 11/2015 |
| EP | 2946527 | 11/2015 |
| EP | 2959408 | 12/2015 |
| JP | 2002-251233 A | 9/2002 |
| JP | 2006338432 | 12/2006 |
| JP | 2007-328716 A | 12/2007 |
| JP | 2008-541225 A | 11/2008 |
| JP | 2009-134689 A | 6/2009 |
| JP | 2009171193 | 7/2009 |
| JP | 2010-108073 A | 5/2010 |
| JP | 2011-039818 A | 2/2011 |
| JP | 2011039820 | 2/2011 |
| JP | 2011518359 | 6/2011 |
| JP | 2015536001 | 12/2015 |
| JP | 2016500167 | 1/2016 |
| JP | 2016500168 | 1/2016 |
| JP | 2016503216 | 2/2016 |
| JP | 2016504679 | 2/2016 |
| WO | 00/49533 A2 | 8/2000 |
| WO | WO00/49533 | 8/2000 |
| WO | 0118712 | 3/2001 |
| WO | 10/59602 A1 | 8/2001 |
| WO | 01/65418 A1 | 9/2001 |
| WO | 03/030031 A2 | 4/2003 |
| WO | 2007122347 | 11/2007 |
| WO | WO2009/119811 A1 | 10/2009 |
| WO | 2010050582 | 5/2010 |
| WO | 2011142026 | 11/2011 |
| WO | 2012/037511 A1 | 3/2012 |
| WO | 2012050582 | 4/2012 |
| WO | 2012/154408 A1 | 11/2012 |
| WO | 2012/158360 A1 | 11/2012 |
| WO | 2014000819 | 1/2014 |
| WO | 2014193943 | 12/2014 |
| WO | 2015191120 | 12/2015 |
| WO | 2016048912 | 3/2016 |

OTHER PUBLICATIONS

U.S. Appl. No. 12/548,187, Final Office Action, dated Jun. 10, 2013, 18 pages.
U.S. Appl. No. 12/548,222, Notice of Allowance, dated Jul. 18, 2013, 12 pages.
U.S. Appl. No. 13/102,665, Final Office Action, dated Jul. 9, 2013, 17 pages.
U.S. Appl. No. 13/107,742, Final Office Action, dated Jul. 3, 2013, 19 pages.
Notice of Allowance for U.S. Appl. No. 11/977,437 dated Jul. 10, 2013, 10 pages.
Oracle™ Fusion Middleware CQL Language Reference, IIg Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
U.S. Appl. No. 11/601,415, Non-Final Office Action issued in Non-KTS matter U.S. Appl. No. 11/601,415 dated Dec. 11, 2013, 58 pages.
U.S. Appl. No. 12/396,464, Non Final Office Action dated Dec. 31, 2013, 16 pages.
U.S. Appl. No. 12/548,281, Final Office Action dated Oct. 10, 2013, 21 pages.
U.S. Appl. No. 12/548,290, Notice of Allowance dated Sep. 11, 2013, 6 pages.
U.S. Appl. No. 12/949,081, Final Office Action dated Aug. 27, 2013, 13 pages.
U.S. Appl. No. 13/089,556, Final Office Action dated Aug. 29, 2013, 10 pages.
U.S. Appl. No. 13/089,556, Non-Final Office Action dated Jan. 9, 2014, 14 pages.
U.S. Appl. No. 13/177,748, Non-Final Office Action dated Aug. 30, 2013, 24 pages.
U.S. Appl. No. 13/193,377, Notice of Allowance dated Aug. 30, 2013, 19 pages.
Arasu et al., An Abstract Semantics and Concrete Language for Continuous Queries over Streams and Relations, 9th International Workshop on Database programming languages, Sep. 2003, 11 pages.
Chandramouli et al., High-Performance Dynamic Pattern Matching over Disordered Streams, Proceedings of the VLDB Endowment, vol. 3, Issue 1-2, Sep. 2010, pp. 220-231.
Chapple, Combining Query Results with the Union Command, ask.com Computing Databases, downloaded from: http://databases.about.com/od/sql/a/union.htm.
Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Hulten et al., Mining Time-Changing Data Stream, Proceedings of the Seventh ACM SIGKDD International Conference on Knowledge Discovery and Data Mining., Aug. 2001, 10 pages.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
PostgresSQL, Manuals: PostgresSQL 8.2: Create Aggregate, believed to be prior to Apr. 21, 2007, 4 pages.
Pradhan, Implementing and Configuring SAP® Event Management, Galileo Press, 2010, pp. 17-21.

(56) References Cited

OTHER PUBLICATIONS

Wilson et al., SAP Event Management, an Overview, Q Data USA, Inc., 2009.
U.S. Appl. No. 13/838,259, filed Mar. 15, 2013, Unpublished, Deshmukh et al.
U.S. Appl. No. 13/839,288, filed Mar. 15, 2013, Unpublished, Deshmukh et al.
Call User Defined Functions from Pig, Amazon Elastic MapReduce, Mar. 2009, 2 pages.
Strings in C, retrieved from the internet: <URL: https://web.archive.org/web/20070612231205/httpl/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance dated Jun. 22, 2012, 20 pages.
U.S. Appl. No. 12/396,464, Final Office Action dated May 16, 2014, 16 pages.
U.S. Appl. No. 12/548,187, Final Office Action dated Jun. 4, 2014, 64 pages.
U.S. Appl. No. 13/089,556, Final Office Action dated Jun. 13, 2014, 14 pages.
U.S. Appl. No. 13/107,742, Non-Final Office Action dated Jun. 19, 2014, 20 pages.
U.S. Appl. No. 13/244,272, Notice of Allowance dated Aug. 12, 2013, 12 pages.
International Application No. PCT/US2011/052019, International Preliminary Report on Patentability dated Mar. 28, 2013, 6 pages.
International Application No. PCT/US2012/034970, International Preliminary Report on Patentability dated Nov. 21, 2013, 7 pages.
International Application No. PCT/US2012/036353, International Preliminary Report on Patentability dated Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance dated Sep. 3, 2014, 7 pages.
U.S. Appl. No. 12/548,187, Advisory Action dated Sep. 26, 2014, 6 pages.
U.S. Appl. No. 12/548,281, Final Office Action dated Aug. 13, 2014, 19 pages.
U.S. Appl. No. 12/913,636, Non-Final Office Action dated Jul. 24, 2014, 22 pages.
U.S. Appl. No. 12/957,201, Non-Final Office Action dated Jul. 30, 2014, 12 pages.
U.S. Appl. No. 13/764,560, Non Final Office Action dated Sep. 12, 2014, 23 pages.
U.S. Appl. No. 13/770,969, Non Final Office Action dated Aug. 7, 2014, 9 pages.
U.S. Appl. No. 14/302,031, Non-Final Office Action dated Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SQL Server 2008 for Developers: From Novice to Professional, a Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion dated Jul. 16, 2014, 12 pages.
International Application No. PCT/US2013/062050, International Search Report & Written Opinion dated Jul. 2, 2014, 13 pages.
International Application No. PCT/US2013/062052, International Search Report & Written Opinion dated Jul. 3, 2014, 12 pages.
International Application No. PCT/US2013/073086, International Search Report dated Mar. 14, 2014.
International Application No. PCT/US2014/017061, International Search Report & Written Opinion dated Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
Business Process Management (BPM). Datasheet [online]. IBM, No Date Given [retrieved on Jan. 28, 2013]. Retrieved from the Internet: <URL: http://www-142.ibm.com/software/products/us/en/category/BPM-SOFTWARE>.
What is BPM? Datasheet [online]. IBM, No Date Given [retrieved on Jan. 28, 2013]. Retrieved from the Internet: <URL: http://www-01.ibm.com/software/info/bpm/what-is-bpm/>.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.

(56) References Cited

OTHER PUBLICATIONS

Stream Query Repository: Online Auctions, at URL: http://www-db.stanford.edu/stream/sqr/onauc.html#queryspecsend, Dec. 2, 2002, 2 pages.

Esper Reference Documentation, Copyright 2008, ver. 2.0.0, 2008, 202 pages.

Oracle Database Data Cartridge Developer's Guide, B28425-03, 11 g Release 1 (11.1), Oracle, Mar. 2008, 372 pages.

Oracle Application Server, Administrator's Guide, 10g Release 3 (10.1.3.2.0), B32196-01, Oracle, Jan. 2007, 376 pages.

Oracle Application Server 10g, Release 2 and 3, New Features Overview, an Oracle White Paper, Oracle., Oct. 2005, 48 pages.

Oracle Database, SQL Reference, 10g Release 1 (10.1), Part No. B10759-01, Dec. 2003, pp. 7-1 to 7-17; 7-287 to 7-290; 14-61 to 14-74.

Complex Event Processing in the Real World, an Oracle White Paper., Sep. 2007, 13 pages.

Coral8 Complex Event Processing Technology Overview, Coral8, Inc., Make it Continuous, Copyright 2007 Coral8, Inc., 2007, pp. 1-8.

Creating WebLogic Domains Using the Configuration Wizard, BEA Products, Version 10.0, Dec. 2007, 78 pages.

Creating Weblogic Event Server Applications, BEA WebLogic Event Server, Version 2.0, Jul. 2007, 90 pages.

Dependency Injection, Wikipedia, printed on Apr. 29, 2011, at URL: Dhttp:en.wikipedia.org/w/index. php? title=DependencLinjection &0ldid=260831402,, Dec. 30, 2008, pp. 1-7.

Deploying Applications to WebLogic Server, BEA WebLogic Server, ver. D 10.0, Mar. 30, 2007, 164 pages.

Developing Applications with Weblogic Server, BEA WebLogic Server, ver. D 10.0, Mar. 30, 2007, 254 pages.

EPL Reference, BEA WebLogic Event Server, ver. 2.0, Jul. 2007, 82 pages.

Esper Reference Documentation Version 3.1.0, EsperTech, retrieved from internet at URL: http://esper.codehaus.org/esper-3.1.0/doc/reference/en/pdf/esper_reference.pdf, 2009, 293 pages.

Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs1 OO/quickstart/guick_start. html, May 10, 2010, 1page.

Getting Started with WebLogic Event Server, BEA WebLogic Event Serverver 2.0, Jul. 2007, 66 pages.

High Availability Guide, Oracle Application Server, 10g Release 3 (10.1.3.2.0), B32201-01, Jan. 2007, 314 pages.

Installing Weblogic Real Time, BEA WebLogic Real Time, Ver. 2.0, Jul. 2007, 64 pages.

Introduction to BEA WebLogic Server and BEA WebLogic Express, BEA WebLogic Server, Ver. 10.0, Mar. 2007, 34 pages.

Introduction to WebLogic Real Time, BEA WebLogic Real Time, ver. 2.0 Jul. 2007, 20 pages.

Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.

Managing Server Startup and Shutdown, BEA WebLogic Server, ver. 10.0, Mar. 30, 2007, 134 pages.

Matching Behavior, .NET Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.

New Project Proposal for Row Pattern Recognition—Amendment to SQL with Application to Streaming Data Queries, H2-2008-027, H2 Teleconference Meeting, Jan. 9, 2008, pp. 1-6.

Oracle CEP Getting Started, Release 11 gR1 (11.1.1) E14476-01, May 2009, 172 pages.

Oracle Complex Event Processing CQL Language Reference, 11g Release 1 (11.1.1) E12048-01, Apr. 2010, 540 pages.

OSGI Service Platform Core Specification, The OSGI Alliance, OSGI Alliance, ver. 4.1, release 4, Apr. 2007, 288 pages.

Release Notes, BEA WebLogic Event Server, Ver. 2.0, Jul. 2007, 8 pages.

Spring Dynamic Modules for OSGi Service Platforms product documentation, SpringSource, D, Jan. 2008, 71 pages.

Stream Base New and Noteworthy, Stream Base, Jan. 1, 2010, 878 pages.

Stream Query Repository: Online Auctions (CQL Queries)., Retrieved from: URL: http://www-db.stanford.edu/strem/sqr/cql/onauc.html, Dec. 2, 2002, 4 pages.

Stream: The Stanford Stream Data Manager, IEEE Data Engineering Bulletin., Mar. 2003, pp. 1-8.

Stream: The Stanford Stream Data Manager, Retrieved from: URL: http://infolab.stanford.edu/stream/, Jan. 5, 2006, pp. 1-9.

Understanding Domain Configuration, BEA WebLogic Server, Ver. 10.0, Mar. 30, 2007, 38 pages.

WebLogic Event Server Administration and Configuration Guide, BEA WebLogic Event D Server, Version. 2.0, Jul. 2007, 108 pages.

WebLogic Event Server Reference, Bea WebLogic Event Server, Version. 2.0, Jul. 2007, 52 pages.

Weblogic Server Performance and Tuning, BEA WebLogic Server, Ver. 10.0, Mar. 30, 2007, 180 pages.

WebSphere Application Server V6.1 Problem Determination: IBM Redpaper Collection, WebSphere Software, IBM/Redbooks, ,., Dec. 2007, 634 pages.

U.S. Appl. No. 10/948,523, Final Office Action dated Jul. 6, 2007, 37 pages.

U.S. Appl. No. 10/948,523, Non-Final Office Action dated Dec. 11, 2007, 47 pages.

U.S. Appl. No. 10/948,523, Notice of Allowance dated Dec. 1, 2010, 17 pages.

U.S. Appl. No. 10/948,523, Notice of Allowance dated Jul. 8, 2008, 30 pages.

U.S. Appl. No. 10/948,523, Office Action dated Jan. 22, 2007, 31 pages.

U.S. Appl. No. 10/948,523, Supplemental Notice of Allowance dated Jul. 17, 2008, 17 pages.

U.S. Appl. No. 10/948,523, Supplemental Notice of Allowance dated Aug. 25, 2008, 3 pages.

U.S. Appl. No. 11/601,415, Advisory Action dated Aug. 18, 2009, 3 pages.

U.S. Appl. No. 11/601,415, Final Office Action dated Jul. 2, 2012.

U.S. Appl. No. 11/601,415, Final Office Action dated May 27, 2009, 26 pages.

U.S. Appl. No. 11/601,415, Final Office Action dated Jun. 30, 2010, 45 pages.

U.S. Appl. No. 11/601,415, Non-Final Office Action dated Sep. 17, 2008, 10 pages.

U.S. Appl. No. 11/601,415, Non-Final Office Action dated Nov. 30, 2009, 32 pages.

U.S. Appl. No. 11/601,415, Office Action dated Dec. 9, 2011.

U.S. Appl. No. 11/873,407, Final Office Action dated Apr. 26, 2010, 11 pages.

U.S. Appl. No. 11/873,407, Non-Final Office Action dated Nov. 13, 2009, 7 pages.

U.S. Appl. No. 11/873,407, Notice of Allowance dated Nov. 10, 2010, 14 pages.

U.S. Appl. No. 11/873,407, Notice of Allowance dated Mar. 7, 2011, 8 pages.

U.S. Appl. No. 11/874,197, Final Office Action dated Aug. 12, 2011, 26 pages.

U.S. Appl. No. 11/874,197, Final Office Action dated Jun. 29, 2010, 17 pages.

U.S. Appl. No. 11/874,197, Non-Final Office Action dated Dec. 22, 2010, 22 pages.

U.S. Appl. No. 11/874,197, Office Action dated Nov. 10, 2009, 14 pages.

U.S. Appl. No. 11/874,202, Final Office Action dated Jun. 8, 2010, 200 pages.

U.S. Appl. No. 11/874,202, Non-Final Office Action dated Dec. 3, 2009, 20 pages.

U.S. Appl. No. 11/874,202, Notice of Allowance dated Mar. 31, 2011, 12 pages.

(56) References Cited

OTHER PUBLICATIONS

U.S. Appl. No. 11/874,202, Notice of Allowance dated Dec. 22, 2010, 29 pages.
U.S. Appl. No. 11/874,850, Notice of Allowance dated Jan. 27, 2010, 11 pages.
U.S. Appl. No. 11/874,850, Notice of Allowance dated Nov. 24, 2009, 17 pages.
U.S. Appl. No. 11/874,850, Notice of Allowance dated Dec. 11, 2009, 5 pages.
U.S. Appl. No. 11/874,896, Final Office Action dated Jul. 23, 2010, 28 pages.
U.S. Appl. No. 11/874,896, Non-Final Office Action dated Dec. 8, 2009, 19 pages.
U.S. Appl. No. 11/874,896, Non-Final Office Action dated Nov. 22, 2010, 25 pages.
U.S. Appl. No. 11/874,896, Notice of Allowance dated Jun. 23, 2011, 30 pages.
U.S. Appl. No. 11/927,681, Non-Final Office Action dated Mar. 24, 2011, 17 pages.
U.S. Appl. No. 11/927,681, Notice of Allowance dated Jul. 1, 2011, 8 pages.
U.S. Appl. No. 11/927,683, Final Office Action dated Sep. 1, 2011, 18 pages.
U.S. Appl. No. 11/927,683, Non-Final Office Action dated Mar. 24, 2011, 13 pages.
U.S. Appl. No. 11/927,683, Notice of Allowance dated Nov. 9, 2011, 10 pages.
U.S. Appl. No. 11/977,437, Final Office Action dated Apr. 8, 2010, 18 pages.
U.S. Appl. No. 11/977,437, Non-Final Office Action dated Oct. 13, 2009, 9 pages.
U.S. Appl. No. 11/977,437, Notice of Allowance dated Mar. 4, 2013, 9 pages.
U.S. Appl. No. 11/977,437, Office Action dated Aug. 3, 2012.
U.S. Appl. No. 11/977,439, Non-Final Office Action dated Apr. 13, 2010, 7 pages.
U.S. Appl. No. 11/977,439, Notice of Allowance dated Mar. 16, 2011, 10 pages.
U.S. Appl. No. 11/977,439, Notice of Allowance dated Aug. 18, 2010, 11 pages.
U.S. Appl. No. 11/977,439, Notice of Allowance dated Sep. 28, 2010, 6 pages.
U.S. Appl. No. 11/977,439, Notice of Allowance dated Nov. 24, 2010, 8 pages.
U.S. Appl. No. 11/977,440, Notice of Allowance dated Oct. 7, 2009, 6 pages.
U.S. Appl. No. 12/193,377, Final Office Action dated Jan. 17, 2013, 24 pages.
U.S. Appl. No. 12/395,871, Non-Final Office Action dated May 27, 2011, 7 pages.
U.S. Appl. No. 12/395,871, Notice of Allowance dated May 4, 2012, 27 pages.
U.S. Appl. No. 12/395,871, Office Action dated Oct. 19, 2011, 33 pages.
U.S. Appl. No. 12/396,008, Non-Final Office Action dated Jun. 8, 2011, 10 pages.
U.S. Appl. No. 12/396,008, Notice of Allowance dated Nov. 16, 2011, 5 pages.
U.S. Appl. No. 12/396,464, Final Office Action dated Jan. 16, 2013, 17 pages.
U.S. Appl. No. 12/396,464, Non-Final Office Action dated Sep. 7, 2012, 18 pages.
U.S. Appl. No. 12/506,891, Notice of Allowance dated Jul. 25, 2012, 8 pages.
U.S. Appl. No. 12/506,891, Office Action dated Dec. 14, 2011, 41 pages.
U.S. Appl. No. 12/506,905, Advisory Action dated Nov. 6, 2012, 6 pages.
U.S. Appl. No. 12/506,905, Notice of Allowance dated Dec. 14, 2012, 15 pages.
U.S. Appl. No. 12/506,905, Office Action dated Aug. 9, 2012, 42 pages.
U.S. Appl. No. 12/506,905, Office Action dated Mar. 26, 2012, 86 pages.
U.S. Appl. No. 12/534,384, Notice of Allowance dated May 7, 2013, 12 pages.
U.S. Appl. No. 12/534,384, Office Action dated Feb. 28, 2012, 38 pages.
U.S. Appl. No. 12/534,384, Office Action dated Feb. 12, 2013, 14 pages.
U.S. Appl. No. 12/534,398, Final Office Action dated Jun. 6, 2012, 27 pages.
U.S. Appl. No. 12/534,398, Notice of Allowance dated Nov. 27, 2012, 10 pages.
U.S. Appl. No. 12/534,398, Office Action dated Nov. 1, 2011, 32 pages.
U.S. Appl. No. 12/548,187, Non Final Office Action dated Sep. 27, 2011, 19 pages.
U.S. Appl. No. 12/548,187, Non-Final Office Action dated Apr. 9, 2013, 17 pages.
U.S. Appl. No. 12/548,187, Office Action dated Jun. 20, 2012, 31 pages.
U.S. Appl. No. 12/548,209, Notice of Allowance dated Oct. 24, 2012, 22 pages.
U.S. Appl. No. 12/548,209, Office Action dated Apr. 16, 2012, 40 pages.
U.S. Appl. No. 12/548,222, Non-Final Office Action dated Apr. 10, 2013, 16 pages.
U.S. Appl. No. 12/548,222, Non-Final Office Action dated Oct. 19, 2011, 19 pages.
U.S. Appl. No. 12/548,222, Office Action dated Jun. 20, 2012, 29 pages.
U.S. Appl. No. 12/548,281, Non-Final Office Action dated Apr. 12, 2013, 16 pages.
U.S. Appl. No. 12/548,281, Non-Final Office Action dated Oct. 3, 2011, 20 pages.
U.S. Appl. No. 12/548,281, Office Action dated Jun. 20, 2012, 29 pages.
U.S. Appl. No. 12/548,290, Final Office Action dated Jul. 30, 2012, 34 pages.
U.S. Appl. No. 12/548,290, Non-Final Office Action dated Oct. 3, 2011, 17 pages.
U.S. Appl. No. 12/548,290, Non-Final Office Action dated Apr. 15, 2013, 17 pages.
U.S. Appl. No. 12/874,197, Notice of Allowance dated Jun. 22, 2012.
U.S. Appl. No. 12/913,636, Final Office Action dated Jan. 8, 2013, 21 pages.
U.S. Appl. No. 12/913,636, Office Action dated Jun. 7, 2012.
U.S. Appl. No. 12/949,081, filed Nov. 18, 2010.
U.S. Appl. No. 12/949,081, Non-Final Office Action dated Jan. 9, 2013, 12 pages.
U.S. Appl. No. 12/957,194, filed Nov. 30, 2010.
U.S. Appl. No. 12/957,194, Non-Final Office Action dated Dec. 7, 2012, 11 pages.
U.S. Appl. No. 12/957,194, Notice of Allowance dated Mar. 20, 2013, 9 pages.
U.S. Appl. No. 12/957,201, filed Nov. 30, 2010.
U.S. Appl. No. 12/957,201, Final Office Action dated Apr. 25, 2013, 11 pages.
U.S. Appl. No. 12/957,201, Office Action dated Dec. 19, 2012, 15 pages.
U.S. Appl. No. 13/089,556, Non-Final Office Action dated Apr. 10, 2013, 10 pages.
U.S. Appl. No. 13/089,556, Office Action dated Nov. 6, 2012, 13 pages.
U.S. Appl. No. 13/089,556, filed Apr. 19, 2011.
U.S. Appl. No. 13/102,665, Office Action dated Feb. 1, 2013, 14 pages.
U.S. Appl. No. 13/107,742, Non-Final Office Action dated Feb. 14, 2013, 16 pages.
U.S. Appl. No. 13/184,528, Notice of Allowance dated Mar. 1, 2012.

(56) References Cited

OTHER PUBLICATIONS

U.S. Appl. No. 13/193,377, Office Action dated Jan. 17, 2013, 25 pages.
U.S. Appl. No. 13/193,377, Office Action dated Aug. 23, 2012, 48 pages.
U.S. Appl. No. 13/244,272, Final Office Action dated Mar. 28, 2013, 29 pages.
U.S. Appl. No. 13/244,272, Office Action dated Oct. 4, 2012.
U.S. Appl. No. 13/396,464, Office Action dated Sep. 7, 2012.
Abadi, et al., Yes Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., STREAM: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.solteam.comitemprintasp?ItemID=979, Oct. 12, 2000, 4 pages.
Chan, et al., Efficient Filtering of XML documents with Xpath expressions, VLDB Journal D, 2002, pp. 354-379.
Chandrasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, pp. 379-390.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.

Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.
Golab, et al., Sliding Window Query Processing Over Data Streams, University of Waterloo, D Waterloo, Ont. Canada, Aug. 2006, 182 pages.
Gosling, et al., The Java Language Specification, Book, copyright, 3rd edition, FG, Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.
Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, pp. 323-350.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.
Liu, et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP? Complex Event Processing, downloaded, at URL:http://complexevents.com/?p=103, Apr. 29, 2011, 5 pages.
Madden, et al., Continuously Adaptive Continuous Queries (CACQ) over Streams, Sigmod, Jun. 4-6, 2002, 12 pages.
Martin, et al., Finding Application Errors and Security Flaws Using PQL, a Program Query Language, OOPSLA'05, Oct. 16, 2005, pp. 1-19.
Babcock, et al., Models and Issues in Data Streams, Proceedings of the 21st ACM SIGMOD-SIGACT-SIDART symposium on Principles of database systems, 2002, 30 pages.

(56) References Cited

OTHER PUBLICATIONS

Motwani, et al., Query Processing Resource Management, and Approximation in a Data 0 Stream Management System, Proceedings of CIDR, Jan. 2003, 12 pages.
Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah, et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion dated Nov. 17, 2011, 55 pages.
International Application No. PCT/US2012/034970, International Search Report and Written Opinion dated Jul. 16, 2012, 13 pages.
International Application No. PCT/US2012/036353, International Search Report and Written Opinion dated Sep. 12, 2012, 11 pages.
Peng, et al., Xpath Queries on Streaming Data, 2003, pp. 1-12.
Peterson, Petri Net Theory and the Modeling of Systems, Prentice Hall, 1981, 301 pages.
PostgresSQL, Documentation: Manuals: PostgresSQL 8.2: User-Defined Aggregates believed to be prior to Apr. 21, 2007, 4 pages.
Sadri, et al., Expressing and Optimizing Sequence Queries in Database Systems, ACM Transactions on Database Systems, vol. 29, No. 2, ACM Press, Copyright, Jun. 2004, pp. 282-318.
Sadtler, et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf, et al., Efficient Scheduling of Heterogeneous Continuous Queries, VLDB, Sep. 12-15, 2006, pp. 511-522.
Stolze, et al., User-defined Aggregate Functions in DB2 Universal Database, Retrievd from: <http://www.128.ibm.com/deve10perworks/db2/1ibrary/tachartic1e/0309stolze/0309stolze.html>, Sep. 11, 2003, 11 pages.
Stump, et al., Proceedings, The 2006 Federated Logic Conference, IJCAR '06 Workshop, PLPV '06: Programming Languages meets Program Verification, 2006, pp. 1-113.
Terry, et al., Continuous queries over append-only database, Proceedings of ACM SIGMOD, 1992, pp. 321-330.
Ullman, et al., Introduction to JDBC, Stanford University, 2005, 7 pages.
Vajjhala, et al., The Java Architecture for XML Binding (JAXB) 2.0, Sun Microsystem, D Inc., Final Release, Apr. 19, 2006, 384 pages.
Vijayalakshmi, et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang, et al., Distributed continuous range query processing on moving objects, DEXA'06 Proceedings of the 17th international conference on Database and Expert Systems Applications, 2006, pp. 655-665.
White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom, et al., CQL: A Language for Continuous Queries over Streams and Relations, Oct. 17, 2007, 62 pages.
Widom, et al., The Stanford Data Stream Management System, PowerPoint Presentation, Oct. 17, 2007, 110 pages.
Wu, et al., Dynamic Data Management for Location Based Services in Mobile Environments, Database Engineering and Applications Symposium, Jul. 16, 2003, pp. 172-181.
Zemke, XML Query, mailed on Mar. 14, 2004, 29 pages.
U.S. Appl. No. 12/548,187, Non-Final Office Action dated Feb. 6, 2014, 54 pages.
U.S. Appl. No. 12/548,281, Non-Final Office Action dated Feb. 13, 2014, 16 pages.
U.S. Appl. No. 13/177,748, Final Office Action dated Mar. 20, 2014, 23 pages.
PCT Patent Application No. PCT/US2014/010832, International Search Report dated Apr. 3, 2014, 9 pages.
Agrawal et al., Efficient pattern matching over event streams, Proceedings of the 2008 ACM SIGMOD international conference on Management of data, Jun. 9-12, 2008, pp. 147-160.
Cadonna et al., Efficient event pattern matching with match windows, Proceedings of the $18^{th}$ ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
Japan Patent Office office actions JPO patent application JP2013-529376 (dated Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
U.S. Appl. No. 12/949,081, Non-Final Office Action dated Jan. 28, 2015, 20 pages.
U.S. Appl. No. 12/957,201, Notice of Allowance dated Jan. 21, 2015, 5 pages.
U.S. Appl. No. 13/107,742, Final Office Action dated Jan. 21, 2015, 23 pages.
U.S. Appl. No. 13/177,748, Non-Final Office Action dated Feb. 3, 2015, 22 pages.
U.S. Appl. No. 13/770,961, Non-Final Office Action dated Feb. 4, 2015, 22 pages.
U.S. Appl. No. 13/770,969, Notice of Allowance dated Jan. 22, 2015, 5 pages.
U.S. Appl. No. 13/829,958, Non-Final Office Action dated Dec. 11, 2014, 15 pages.
U.S. Appl. No. 13/906,162, Non-Final Office Action dated Dec. 29, 2014, 10 pages.
International Application No. PCT/US2014/010832, Written Opinion dated Dec. 15, 2014, 5 pages.
International Application No. PCT/US2014/010920, International Search Report and Written Opinion dated Dec. 15, 2014, 10 pages.

(56) References Cited

OTHER PUBLICATIONS

International Application No. PCT/US2014/017061, Written Opinion dated Feb. 3, 2015, 6 pages.
International Application No. PCT/US2014/039771, International Search Report and Written Opinion dated Sep. 24, 2014, 12 pages.
Cranor et al. "Gigascope: a stream database for network applications," Proceedings of the 2003 ACM SIGMOD international conference on Management of data, pp. 647-651 (Jun. 2003).
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomas et al., RoSeS: A Continuous Content-Based Query Engine for RSS Feeds, DEXA 2011, Toulouse, France, Sep. 2, 2011, pp. 203-218.
Non-Final Office Action for U.S. Appl. No. 13/830,129 dated Feb. 27, 2015, 19 pages.
International Application No. PCT/US2014/068641, International Search Report and Written Opinion dated Feb. 26, 2015, 11 pages.
European Patent Application No. 12783063.6, Extended Search Report dated Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Map Reduce, Wikipedia, The Free Encyclopedia, 2016, 11 pages.
Pig (programming tool), Wikipedia, The Free Encyclopedia, 2016, 4 pages.
U.S. Appl. No. 13/764,560, Notice of Allowance dated Sep. 30, 2016, 10 pages.
U.S. Appl. No. 13/830,502, Final Office Action dated Jul. 6, 2016, 28 pages.
U.S. Appl. No. 14/079,538, Final Office Action dated Jul. 27, 2016, 28 pages.
U.S. Appl. No. 14/883,815, Notice of Allowance dated Aug. 30, 2016, 13 pages.
U.S. Appl. No. 13/827,631, Final Office Action dated Oct. 20, 2016, 12 pages.
European Application No. 12783063.6, Office Action dated Nov. 11, 2015, 8 pages.
Mahlke et al., Comparison of Full and Partial Predicated Execution Support for ILP Processors, ICSA '95, Santa Margherita Ligure, 1995, pp. 138-149.
Olston et al., Pig Latin, A Not-So-Foreign Language for Data Processing, 2008, 12 pages.
International Application No. PCT/US2015/016346, International Preliminary Report on Patentability dated Sep. 30, 2016, 6 pages.
International Application No. PCT/US2015/051268, Written Opinion dated Aug. 18, 2016, 7 pages.
Yang et al., Map-Reduce-Merge, Simplified Relational Data Processing on Large Clusters, 2007, 12 pages.
U.S. Appl. No. 13/829,958, Non-Final Office Action dated Dec. 27, 2016, 20 pages.
U.S. Appl. No. 13/838,259, Non-Final Office Action dated Jan. 4, 2017, 65 pages.
U.S. Appl. No. 14/559,550, Non-Final Office Action dated Jan. 27, 2017, 16 pages.
U.S. Appl. No. 14/610,971, Non-Final Office Action dated Dec. 19, 2016, 10 pages.
U.S. Appl. No. 14/621,098, Non Final Office Action dated Nov. 14, 2016, 17 pages.
U.S. Appl. No. 15/003,646, Non-Final Office Action dated Dec. 2, 2016, 9 pages.
U.S. Appl. No. 15/015,933, Non-Final Office Action dated Jan. 30, 2017, 11 pages.
U.S. Appl. No. 13/830,759, Non-Final Office Action dated Feb. 10, 2017, 23 pages.
International Application No. PCT/US2015/051268, International Preliminary Report on Patentability dated Dec. 8, 2016, 12 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
International Application No. PCT/US2014/039771, International Search Report and Written Opinion dated Apr. 29, 2015 6 pages.
International Application No. PCT/US2015/016346, International Search Report and Written Opinion dated May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Sadana "Interactive Scatterplot for Tablets," The 12th International Working Conference on Advanced Visual Interfaces, available from https://vimeo.com/97798460 (May 2014).
U.S. Appl. No. 13/827,631, Non Final Office Action dated Feb. 16, 2017, 16 pages.
U.S. Appl. No. 13/830,428, Non-Final Office Action dated Mar. 22, 2017, 25 pages.
U.S. Appl. No. 13/830,502, Non-Final Office Action dated Apr. 7, 2017, 28 pages.
U.S. Appl. No. 14/036,500, Non-Final Office Action dated Feb. 9, 2017, 34 pages.
U.S. Appl. No. 14/079,538, Non-Final Office Action dated Mar. 31, 2017, 24 pages.

(56) References Cited

OTHER PUBLICATIONS

U.S. Appl. No. 15/360,650, Non-Final Office Action dated Mar. 9, 2017, 34 pages.
U.S. Appl. No. 13/830,735, Non-Final Office Action dated Apr. 4, 2017, 16 pages.
U.S. Appl. No. 15/177,147, Non-Final Office Action dated Apr. 7, 2017, 12 pages.
U.S. Appl. No. 14/866,512, Non-Final Office Action dated Apr. 10, 2017, 24 pages.
U.S. Appl. No. 14/610,971, Notice of Allowance dated Apr. 12, 2017, 11 pages.
China Patent Application No. CN201480030482.3, Office Action dated Feb. 4, 2017, 5 pages.
China Patent Office office actions for patent application CN201180053021.4 (dated Oct. 28, 2015).
Bestehorn Fault-tolerant query processing in structured P2P-systems, Springer Science+Business Media LLC Distrib Parallel Databases 28:33-66 (May 8, 2010).
Cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the $22^{nd}$ International Technical Meeting of the Satellite Division of the Institute of Navigation (ION GNSS 2009). (Sep. 25, 2009) pp. 538-546.
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
International Preliminary Report on Patentabiilty dated Jun. 16, 2016 for PCT/US2014/068641, 7 pages.
International Application No. PCT/RU2015/000468, International Search Report and Written Opinion dated Apr. 25, 2016, 9 pages.
International Application No. PCT/US2015/016346, International Search Report and Written Opinion dated May 24, 2016, 5 pages.
China Patent Office office action for patent application CN201180053021.4 (dated May 27, 2016).
Final Office Action for U.S. Appl. No. 13/830,759 dated Feb. 18, 2016, 18 pages.
Japan Patent Office office actions JPO patent application JP2014-509315 (dated Mar. 15, 2016).
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Notice of Allowance for U.S. Appl. No. 13/906,162 dated Apr. 5, 2016, 7 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.

Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Hiroyuki Kitagawa et al., Sensing Network, Information Processing, Information Processing Society of Japan, Sep. 15, 2010, vol. 51, No. 9, pp. 1119-1126.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Notice of Allowance for U.S. Appl. No. 12/548,187, dated Feb. 2, 2016, 15 pages.
Notice of Allowance for U.S. Appl. No. No. 14/037,072 dated Feb. 16, 2016, 17 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
China Patent Office office actions for patent application CN201280022008.7 (dated Dec. 3, 2015).
International Search Report and Written Opinion dated Dec. 15, 2015 for PCT/US2015/051268, 17 Pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
Notice of Allowance for U.S. Appl. No. 12/913,636 dated Oct. 27, 2015, 22 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.

(56) References Cited

OTHER PUBLICATIONS

U.S. Appl. No. 13/827,631, Final Office Action dated Aug. 30, 2017, 18 pages.
U.S. Appl. No. 13/830,428, Final Office Action dated Oct. 5, 2017, 33 pages.
U.S. Appl. No. 13/830,735, Final Office Action dated Sep. 29, 2017, 16 pages.
U.S. Appl. No. 13/830,759, Notice of Allowance dated Aug. 23, 2017, 14 pages.
U.S. Appl. No. 14/037,153, Non-Final Office Action dated Aug. 2017, 45 pages.
U.S. Appl. No. 14/755,088, Notice of Allowance dated Oct. 11, 2017, 5 pages.
U.S. Appl. No. 14/861,687, Non-Final Office Action dated Oct. 2017, 10 pages.
U.S. Appl. No. 14/866,512, Final Office Action dated Sep. 13, 2017, 25 pages.
U.S. Appl. No. 15/177,147, Non-Final Office Action dated Nov. 3, 2017, 6 pages.
Chinese Application No. 201380056017.2, Office Action dated Jul. 17, 2017, 25 pages (16 pages for the original document and 9 pages for the English translation).
Chinese Application No. 201380056099.0, Office Action dated Jul. 4, 2017, 26 pages (14 pages for the original document and 12 pages for the English translation).
Chinese Application No. 201480030482.3, Notice of Decision to Grant dated Aug. 31, 2017, 4 pages.
Japanese Application No. 2015-534678, Office Action dated Aug. 29, 2017, 3 pages.
Japanese Application No. 2015-534680, Office Action dated Aug. 22, 2017, 10 pages.
European Patent Application EP14825489.9, Office Action dated Jul. 28, 2017, 7 pages.
U.S. Appl. No. 13/829,958, Final Office Action dated Jun. 26, 2017, 22 pages.
U.S. Appl. No. 13/838,259, Final Office Action dated Jul. 7, 2017, 69 pages.
U.S. Appl. No. 14/036,500, Notice of Allowance dated Jun. 30, 2017, 14 pages.
U.S. Appl. No. 14/036,659, Non-Final Office Action dated Jun. 2, 2017, 28 pages.
U.S. Appl. No. 14/559,550, Final Office Action dated Jul. 12, 2017, 21 pages.
U.S. Appl. No. 14/621,098, Notice of Allowance dated May 3, 2017, 9 pages.
U.S. Appl. No. 14/755,088, Non-Final Office Action dated Jun. 14, 2017, 13 pages.
U.S. Appl. No. 15/003,646, Notice of Allowance dated May 19, 2017, 16 pages.
U.S. Appl. No. 15/015,933, Notice of Allowance dated May 17, 2017, 16 pages.
U.S. Appl. No. 15/360,650, Notice of Allowance dated Jul. 24, 2017, 13 pages.
Akama et al., Design and Evaluation of a Data Management System for WORM Data Processing, Journal of Information Processing, Information Processing Society of Japan, vol. 49, No. 2, Feb. 15, 2008, pp. 749-764.
Chinese Application No. 201380056012.X, Office Action dated Jun. 1, 2017, 22 pages (10 pages for the original document and 12 pages for the English translation).
Japanese Application No. 2015-534676, Office Action dated Jun. 27, 2017, 9 pages.
U.S. Appl. No. 13/829,958, Non-Final Office Action dated Jan. 8, 2018, 22 pages.
U.S. Appl. No. 13/830,502, Final Office Action dated Nov. 8, 2017, 27 pages.
U.S. Appl. No. 13/830,735, Notice of Allowance dated Jan. 26, 2018, 9 pages.
U.S. Appl. No. 13/838,259, Non-Final Office Action dated Nov. 27, 2017, 69 pages.
U.S. Appl. No. 14/036,659, Notice of Allowance dated Nov. 30, 2017, 13 pages.
U.S. Appl. No. 14/079,538, Final Office Action dated Nov. 16, 2017, 26 pages.
U.S. Appl. No. 14/559,550, Notice of Allowance dated Dec. 5, 2017, 6 pages.
U.S. Appl. No. 14/973,377, Non-Final Office Action dated Nov. 30, 2017, 17 pages.
U.S. Appl. No. 14/866,512, Notice of Allowance dated Feb. 15, 2018, 5 pages.
Chinese Application No. 201480004736.4, Office Action dated Nov. 29, 2017, 13 pages (7 pages of English translation and 6 pages of Original document).
Japanese Application No. 2015-534676, Office Action dated Jan. 23, 2018, 9 pages.
Japanese Application No. 2015-552781, Office Action dated Nov. 21, 2017, 3 pages.
Japanese Application No. 2015-558217, Office Action dated Jan. 9, 2018, 3 pages.
Japanese Application No. 2015-552765, Office Action dated Dec. 5, 2017, 2 pages.
Chinese Application No. 201480004731.1, Office Action dated Apr. 4, 2018, 13 pages (6 pages of the original document and 7 pages for the English translation).
Chinese Application No. 201480009223.2, Office Action dated Apr. 18, 2018, 18 pages (10 pages of the original document and 8 pages for the English translation).
Chinese Application No. CN201380056017.2, Office Action dated May 11, 2018, 8 pages.
European Application No. 13776641.6, Office Action dated Apr. 3, 2018, 5 pages.
European Application No. EP13776642.4, Office Action dated May 3, 2018, 5 pages.
European Application No. EP13776643.2, Office Action dated May 3, 2018, 4 pages.
Japanese Application No. JP2015-558217, Office Action dated May 29, 2018, 4 pages.
Japanese Application No. 2015-534678, Office Action dated Apr. 24, 2018, 4 pages (3 pages of the original document and 1 page for the English translation).
Japanese Application No. JP2016-516778, Office Action dated May 22, 2018, 8 pages.
U.S. Appl. No. 13/827,631, Notice of Allowance dated Mar. 13, 2018, 10 pages.
U.S. Appl. No. 13/830,428, Notice of Allowance dated Apr. 2, 2018, 9 pages.
U.S. Appl. No. 13/830,502, Notice of Allowance dated Apr. 2, 2018, 8 pages.
U.S. Appl. No. 14/037,153, Final Office Action dated May 3, 2018, 16 pages.
U.S. Appl. No. 14/973,377, Notice of Allowance dated May 2, 2018, 8 pages.
U.S. Appl. No. 15/177,147, Notice of Allowance dated Mar. 22, 2018, 7 pages.
U.S. Appl. No. 15/795,121, Non-Final Office Action dated Apr. 6, 2018, 21 pages.
U.S. Appl. No. 14/861,687, Notice of Allowance dated Jun. 6, 2018, 10 pages.
Configuring Oracle CQL Processors, Available Online at https://docs.oracle.com/cd/E23943_01/dev.1111/e14301/processorcql.htm#CEPED705, Sep. 9, 2012, pp. 1-14.
U.S. Appl. No. 13/838,259, Notice of Allowance dated Nov. 23, 2018, 12 pages.
U.S. Appl. No. 15/936,037, Non-Final Office Action dated Jun. 6, 2018, 30 pages.
U.S. Appl. No. 15/936,037, Notice of Allowance dated Oct. 5, 2018, 5 pages.
Chinese Application No. 201380056017.2, Office Action dated Nov. 23, 2018, 3 pages.
Chinese Application No. 201380063379.4, Office Action dated Oct. 9, 2018, 7 pages (3 pages for the original document and 4 pages for the English translation).

(56) References Cited

OTHER PUBLICATIONS

European Application No. 13776642.4, Office Action dated Oct. 8, 2018, 7 pages.
European Application No. 14709807.3, Summons to Attend Oral Proceedings mailed on Oct. 1, 2018, 8 pages.
Japanese Application No. 2015-534676, Office Action dated Oct. 9, 2018, 4 pages (3 pages for the original document and 1 page for the English translation).
Japanese Application No. 2015-552765, Office Action dated Nov. 6, 2018, 6 pages (3 pages for the original document and 3 pages for the English translation).
Japanese Application No. 2016-516778, Office Action dated Oct. 23, 2018, 9 pages (5 pages for the original document and 4 pages for the English translation).
U.S. Appl. No. 13/829,958, Notice of Allowance dated Jun. 11, 2018, 13 pages.
U.S. Appl. No. 13/838,259, Final Office Action dated Jun. 14, 2018, 80 pages.
U.S. Appl. No. 14/079,538, Non-Final Office Action dated Jun. 20, 2018, 22 pages.
Chinese Application No. 201380056099.0, Office Action dated Apr. 26, 2018, 8 pages (3 pages for the original document and 5 pages for the English translation).
Chinese Application No. 201380063379.4, Office Action dated Feb. 2, 2018, 13 pages (6 pages for the original document and 7 pages for the English translation).
European Application No. 11761766.2, Office Action dated Sep. 5, 2018, 7 pages.
European Application No. 13776643.2, Office Action dated Sep. 6, 2018, 7 pages.
European Application No. 14709807.3, Office Action dated May 17, 2018, 6 pages.
European Application No. 14733856.0, Office Action dated Aug. 9, 2018, 8 pages.
Japanese Application No. 2015-552781, Office Action dated Aug. 7, 2018, 4 pages (3 pages for the original document and 1 page for the English translation).
International Application No. PCT/RU2015/000468, International Preliminary Report on Patentability dated Feb. 8, 2018, 10 pages.
International Application No. PCT/US2014/010832, International Preliminary Report on Patentability dated Apr. 24, 2015, 27 pages.

\* cited by examiner

REAL-TIME BUSINESS EVENT ANALYSIS AND MONITORING

CROSS REFERENCES TO RELATED APPLICATIONS

The present application is a non-provisional of and claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING, the entire contents of which are incorporated herein by reference for all purposes. This application is also related to application Ser. No. 13/830,759, filed Mar. 14, 2013, now U.S. Pat. No. 9,852,186, entitled "Managing risk with continuous queries," the entire contents of which is hereby incorporated by reference as if fully set forth herein, under 35 U.S.C. § 120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Methods and systems associated with real-time business event analysis and monitoring may be provided. In some examples, a system may be provided, the system may include memory storing instructions and/or processors configured to access the memory and execute the instructions to at least receive, at a business intelligence server configured with a continuous query service, a logical request. The system may also execute the instructions to translate, by the continuous query service, the logical request into a physical request. Additionally, in some examples, the system may execute the instructions to provide business intelligence information based at least in part querying against an event data stream with a continuous query configured based at least in part on the physical request translated by the continuous query service. Further, the system may also be configured to execute the instructions to implement a continuous query engine as part of the continuous query service. In some aspects, the continuous query engine may be configured to receive data of the event data stream from the business intelligence server. The continuous query engine may also be configured to provide results to an event sink associated with the business intelligence server.

Additionally, in some examples, the business intelligence server may be configured to manage business intelligence data associated with one or more users. The business intelligence information may include at least one of a result of the continuous query or an alert configured to identify the result of the continuous query. Further, in some examples, the business intelligence information may be provided to the one or more users via a graphical user interface. In some aspects, the logical request may include at least a tactical query generated based at least in part on a request from a user for the business intelligence information. Additionally, the tactical query may be received by the continuous query service from a logical business model of the business intelligence server. Further, in some examples, the translation of the physical request may include generation of at least the continuous query.

Additionally, in some examples, a computer-readable memory may be provided. The memory may be configured to store instructions that cause one or more processors to receive, by a continuous query service, a tactical query from a business intelligence server, the tactical query configured based at least in part on a logical request for event data. The instructions may also cause the processors to generate, by the continuous query service, a continuous query configured to query against a stream of the event data, the continuous query based at least in part on the tactical query. Additionally, in some examples, the instructions may cause the processors to query the stream of event data with the continuous query. In some aspects, the instructions may also cause the processors to provide results of the continuous query to an event sink of the business intelligence server. Further, in some examples, the instructions may cause the one or more processors to provide information of the event sink to a dashboard for visualization of the event data based at least in part on the logical request. The logical request may be received by the business intelligence server as a logical statement configured to identify the events. The instructions may also cause the one or more processors to enable output of the continuous query to be stored in an output table, wherein an alert is provided based at least in part on the output table. In some aspects, the plurality of instructions may also include instructions that cause the one or more processors to provide a signal to the dashboard that the output of the continuous query has accumulated in the output table and/or enable the dashboard to perform a tactical query to refresh the dashboard with the output accumulated in the output table. Further, in some aspects, the plurality of instructions may also include instructions that cause the one or more processors to push contents of the event sink to the dashboard and/or enable the dashboard to incrementally update a view of the dashboard based at least in part on the pushed contents of the event sink.

Further, in some examples, a computer-implemented method may be provided. The method may be configured to implement, by a business intelligence server, a continuous query service. Additionally, the method may be configured to receive, by the continuous query service, a tactical query from the business intelligence server, the tactical query configured based at least in part on a logical request of a user. The method may also be configured to generate, by the continuous query service, a continuous query configured to query against a stream of event data associated with the user based at least in part on the tactical query. Additionally, in some aspects, the method may be configured to implement at least one event sink configured to receive results of the continuous query. The method may also be configured to implement a continuous query engine configured to process the event data by utilizing the continuous query. The method may also be configured to enable the continuous query engine to push output of the continuous query to the at least one event sink. The method may also be configured to provide an alert to the user based at least in part on the output of the continuous query. Additionally, in some aspects, the method may also be configured to enable the output of the continuous query to be stored in an output table, wherein the alert is provided to the user based at least in part on the output table. The output table may be configured to accumulate at least one of an insert or a delete output received from the continuous query service. The method may also be configured to provide a signal to a dashboard of the user that the output has accumulated in the output table and/or enable the dashboard to perform a tactical query to refresh the dashboard with the output accumulated in the output table. Further, the method may be configured to push contents of the at least one event sink to a dashboard of the user and/or enable the dashboard of the user to incrementally update a view of the dashboard based at least in part on the pushed contents of the at least one event sink.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
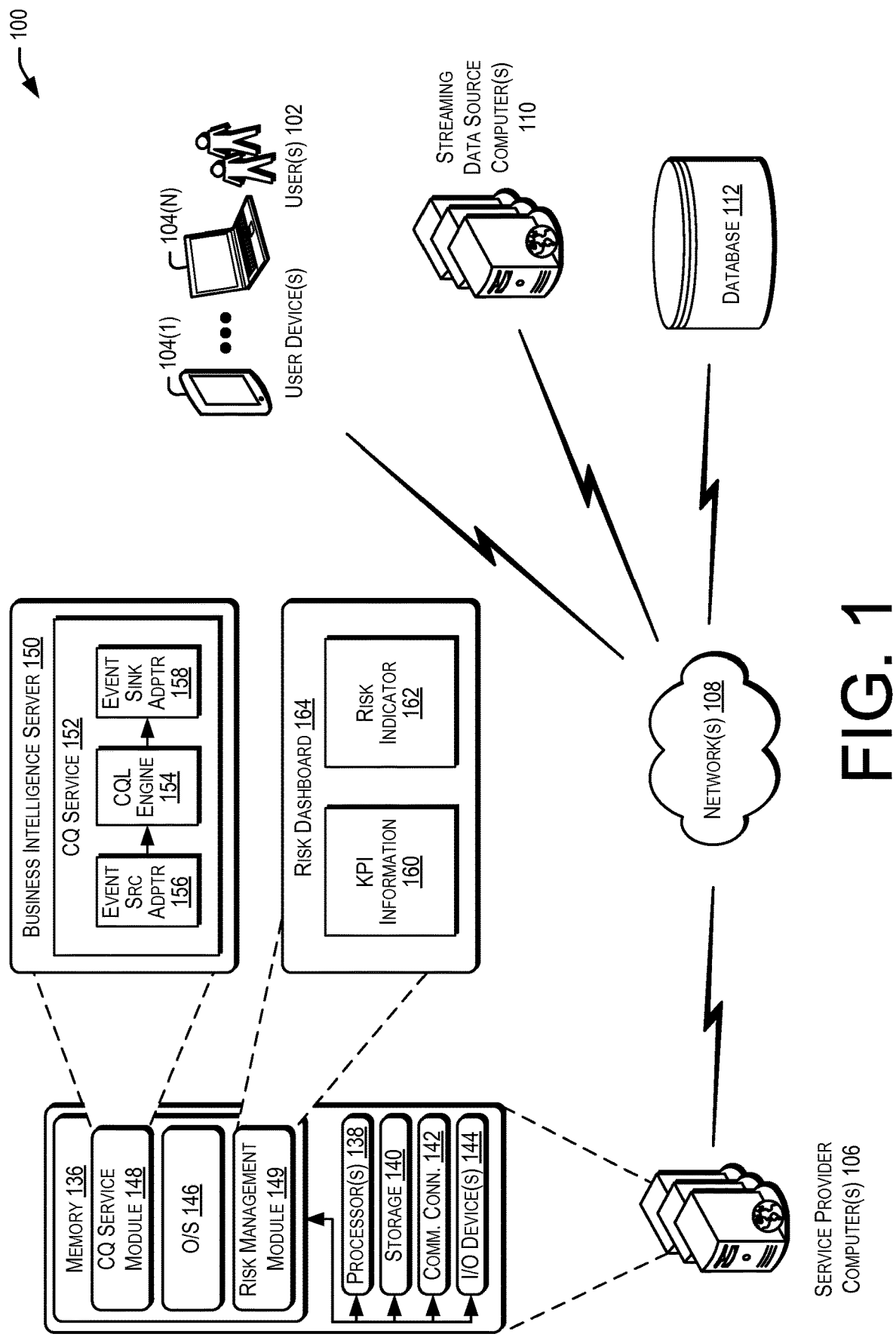
FIG. 1 is a simplified block diagram illustrating an example architecture for implementing techniques for managing real-time business event analysis and monitoring and/or techniques for managing risk with continuous queries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, mechanisms to support a continuous query service (CQ Service) for implementing continuous query language (CQL) queries (also referred to as "query statements") within a Business Intelligence (BI) server or other server configured to manage historical data and/or tactical queries may be provided. For example, in some scenarios, a complex event processor (CEP) may manage BI data of a user via a BI server. However, in order to manage and/or analyze real-time event streams, a CQ Service may be utilized. The CQ Service may then delegate some real-time services to a CQ engine or other software module capable of processing in-flight data. In some aspects, the BI server may receive requests from users in logical form and may be configured to translate those logical requests into physical requests. Additionally, in some examples, mechanisms to support analyzing and/or visualizing key performance indicators (KPIs) and associated risk indicators, in real-time, may be provided. For example, a KPI dashboard may include real-time KPI data obtained via one or more CQL queries and may also include real-time risk indicators that allow for visualization of real-time changes in the data that may affect the KPIs in the future. The risk indicators may be provided by users and/or generated automatically based at least in part on the KPI information.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted above, a stream may be the principle source of data that CQL queries may act on. Additionally, as noted, a stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, BI may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefor expand from a mere strategic analytical tool into the front lines in business operations. As such, BI systems may also be configured to analyze event streams and compute aggregates in real time.

In some examples, a continuous query language service CQ Service may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:

Remoting service for BI Analytics Server as CQL engine Gateway;

Event source/sink adapter;

Generate data definition languages (DDLs) from logical SQL plus CQL extensions;

Provide unified model for all types of continuous queries and implementation selections;

Maintain metadata and support restartability; and

High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPI may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

In some examples, features of the present disclosure may allow business users to design and view performance dashboards based on business data sourced from a heterogeneous environment. In some aspects, a metric may be a measurement of business activity, such as "number of calls," "number of dropped calls," "average call processing time." A business goal may be a measure of the desired outcome of a business strategy. A metric that measures business activity against a goal may be called a key performance indicator (KPI).

There may be two major types of KPIs: outcome metrics and driver metrics. Outcome metrics (also referred to as "lagging indicators") may measure the output of business activity that a strategy is designed to achieve (e.g. return rate per month). Driver metrics (also referred to as "leading indicators") may measure business activity that influences the results of the outcome business indicators. A KPI can be used to monitor specific aspects of the business and can be designed to trigger a chain reaction of process improvements throughout the organization. In some cases, regression algorithms may be utilized to predict future outcomes based on the current level of activities so people can see if they are going to meet their goals.

Other metrics, such as activity metrics, may measure business activity related to performance indicators but may not have goals associated with them. For example, they may provide context around these performance indicators to make informed decisions (e.g. top 10 products, top 10 customers, etc.).

In some examples, a performance dashboard may display multiple attributes of a performance metric to give a user a comprehensive view of the system. In at least one performance indicator watch list, a name, trend, status (e.g. green, yellow, red with visual encoding), target value, actual value, and/or variance percentage may be provided. Further, risk indicators, unlike performance indicators, may measure the "at risk" level of a business operation. It may provide an early warning sign to identify events that may harm the existing processes. Risk indicators may also be customized and/or set by a user such that the user and/or an administrator may determine which risks should be monitored and/or analyzed. Risk indicators may also be generated automatically based at least in part on KPI information being monitored.

According to at least some features of the present disclosure, operational dashboards may be utilized to control operational activity and help ensure that processes stay within prescribed limits for productivity, quality, and/or efficiency. In some cases, operation staff may use the operational dashboards to monitor business events as they occur and the focus of operational dashboard may be to display what is happening now. The "detect-and-respond" dashboard may be common (e.g. call centers, logistics operations) and action oriented. This type of dashboard may also make heavy use of alerts to notify users about exceptions and/or conditions as they happen. Alerts can be used to send emails to one or more people but they can also show up on a dashboard via an icon next to the relevant metric. For example, an alert might detect that the number of inbound service calls for the last couple of hours has increased by 20 percent over an expected level. While sending out alerts, the system may also be able to provide a context for drilling down and correlating purposes. This functionality may be performed by a CQL server, engine, or service.

In one non-limiting example, the dashboard may display KPIs and risk indicators for call processing time (e.g., for a call center, etc.). For example a KPI may be at 100 and a target may be 200. Using these numbers, a simple comparison could indicate that the KPI is not yet close to meeting that target. However, if the trend indicates that the processing time has been increasing by 50%, 60%, etc., then it's possible that there may be a problem. Thus, the risk indicator may be a powerful tool for identifying issues before they occur. It lets one know how other business factors are likely to affect the KPI being monitored. For example, a call center may have a fixed capacity of a fixed number of employees available to take calls. But all of a sudden, on a particular day, a spike in incoming calls may occur. Thus, given your fixed resources there may to be a delay before those people can turn around and start on handling the calls. In this case, if the system notices, if a query monitors incoming calls in real-time (e.g., whether are they spiking up), a user may be able to identify that the spike in incoming calls may eventually affect call processing time.

Thus, in some examples, the system may allow users to associate these risk indicators with various KPIs. So, for a call processing time KPI, the trend of incoming calls may be monitored as the risk indicator. Further, a query could be designed to alert this KPI when spikes in incoming calls are identified. Because even though the current data may look acceptable, the real-time data (e.g., based on another indicator) may identify an issue. Other examples of risk indicators associated with KPIs may include, but are not limited to, dollar price of closed deals associated with a number of closed deals. For example, if the average dollar amount per deal is below some number or percentage, revenue goals may not be met even though the number of deals KPI does not indicate an issue.

Additionally, in some examples, business logic may be associated with each KPI. As such, the business logic may determine what is being measured, what the target value is, where the target is coming from, and/or what the risk indicators are. Additionally, as noted, each of these values may be configured by a user. The business logic and/or business event data may then be entered into a model and maintained in real-time. As such, KPI information may be lagging indicators, while the risk indicators may be leading indicators.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing real-time business event analysis and monitoring and/or techniques for managing risk with continuous queries may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110 (e.g., event streams). In some examples, the users 102 may utilize the user devices 104 to interact with the service provider computers 106 by providing queries (also referred to as "query statements") or other requests (e.g., logical requests) for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the techniques for managing real-time business event analysis and monitoring and/or techniques for managing risk with continuous queries described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a CQ Service module 148 and/or a risk management module 149. As used herein, modules may refer to programming modules executed by servers or clusters of servers that are part of a service. In this particular context, the modules may be executed by the servers or clusters of servers that are part of the service provider computers 106. In some examples, the CQ Service module 148 may be configured to, receive, identify, generate, or otherwise provide one or more continuous queries within a BI server 150. In some examples, as noted above, the BI server 150 may include a CQ Service 152 configured to generate, manage, and/or implement the continuous queries via a CQL engine 154 or other event processing engine. In some instances, the CQ Service 152 may also include one or more event source adapters 156 and/or event sink adapters 158 for receiving and/or providing event data, respectively. In some examples, when historical KPI data is used, the historical BI logical query may run with a schedule and the result may get passed to the CQL engine 158 as a stream. In some cases, the continuous query may be given in a quoted string. Additionally, the query may be opaque to the CQ Service 150 so that the CQ Service 150 won't try to parse it itself.

Additionally, in some examples, the CQ Service 152 may a component for coordinating event processing components of the BI server 150 in a federated way. Also, in some cases, the CQ engine 154 may be configured to perform compensation and/or event processing components. Some event sources that may be in communication with the one or more event source adapters 156 may include, but are not limited to, service-oriented architecture (SOA) sources, business process management (BPM) sources, event detection and notification (EDN) sources, Java messaging service (JMS) sources, Java EE Connector Architecture (JCA) sources, database change data capture (CDC) sources, and/or inbound web services. Additionally, some event sinks that may be in communication with the one or more event sink adapters 158 may include, but are not limited to, Action framework, database Writebacks, CQ output tables, SOA sinks, EDN sinks, JMS sinks, JCA sinks, and/or compensation engines (e.g., another CQL engine).

Further, in some examples, some CQ Service 152 responsibilities may include, but are not limited to, translating logical requests (e.g., tactical queries) into physical requests (e.g., continuous queries) including event sources and sinks, determining function shipping/implementation based at least in part on the continuous query and capabilities of some components. Examples of capabilities to be determined may include: whether multiple event sources are involved, whether and/or how to implement compensating logic of the CQL engine 154, how to set up event sources (e.g., setting up GoldenGate through ODI-EE and then subscribing to a JMS topic and/or directly receiving change events from a persistence layer), how to set up the CQL engine 154 for or with compensating logic, whether and/or how to register appropriate DDLs, when and/or how to subscribe to output channels, event sink setup (e.g., setting up Action Framework and then a CQ output table, etc.), and/or mediating flow from an event source via processing to event sinks.

Utilizing an event model may also include having an event source/sink in a physical model that defines physical event source/sinks. For example, a data source may be an event source including the idea that event sources and/or sinks can be derived from the data source, data changes can become events, and/or change data captures may be set up. In some cases, logical event sources may define semantics, filters, and/or aggregations across streams. Presentation event sources may flatten event attributes and define which users can access and create which event sources. Additionally, semantic model mappings may include the idea that physical event models appear as streams and may define simple event streams; while logical event models may appear as views and/or queries and may define complex event streams (e.g., CQL logic). Example event models may include, but are not limited to, event attributes mapping and selection, aggregation across events, windowing, event filtering, pattern matching, etc.

Example physical events may include "call activity," represented by CallActivity(centerID, callID, customerID, activity, time), in some examples. A physical data source may include "customer data," represented by Customer (customerID, customerName), in some examples. For example, a logical event to physical CQL query translation may be implemented using the following statements:
CallInfoHour(centerId, Mild, customerId, customerName, time, activity): join of CallActivity, Customer
Select c.centerId, c.callId, cu.customerId, cu.customerName, c.time, c.activity from callActivity[range 1 hour] as c, customerId
where c.customerId=cu.customerId
CallProcessingTimeHour(centerId, Mild, customerId, customerName, long cpt): pattern
Select centerId, Mild, customerId, customerName, (T.last-T.first) as cpt from callInfoHour
MATCH RECOGNIZE (
MEASURES B.time as first, E.time as last
PATTERN (B E)
DEFINE B as B.activity='OPEN', E as E.activity='CLOSE' or E.activity='DROP'
as T
NormCallProcessingTimeDay(centerId, Mild, customerId, customerName, long cpt): aggregation
Select Mild, customerId, customerName, avg(cpt) from CallProcessingTimeDay group by centerId
Additionally, a KPI may be implemented using the following statements:
AvgCallProcessingTimeHour(centerId, Mild, customerId, customerName, long cpt): aggregation
Select Mild, customerId, customerName, avg(cpt) from CallProcessingTimeHour group by centerId And, an alert may be implemented as:
AlertAvgCallProcessingTimeHour(centerId, Mild, customerId, customerName, long cpt)
Select a.centerId, a.callId, a.customerId, a.customerName, a.cpt from AvgCallProcesingTimeHour as a, NormCallProcessingTimeDay as n Where a.cpt>n.cpt Further, in some examples, an output propagation model may include data from the CQ Service 152 being propagated up to a dashboard (e.g., a GUI) for real-time dashboard use cases. In some examples, a signal and pull model may be implemented that utilizes a CQ output table. In this example, the CQP outputs may be accumulated in the CQ output table and a signal may be provided to the dashboard (e.g., utilizing Action Framework or the like). Up receiving the signal, the dashboard may issue a one-time query to refresh its data. In some cases, the output table may accumulate insert and/or delete outputs from the CS Service 152. Alternatively, or in addition, an incremental push model (e.g., utilizing change data notifications) may be implemented. Instead of an output table, a CDN may contain the output data. This data may then be incrementally pushed to the dashboard utilizing Action Framework or the like. The dashboard may then update the view incrementally. Further, in some cases, relations may be mapped to streams and vice versa. Also, some part of a logical SQL execution plan may be delegated to the CQ Service 152 to leverage incremental aggregation or the like. Further, logic tables may also be utilized as an external relation within CQL.

Additionally, in some examples, the risk management module 149 may be configured to enable generation and/or visualization of KPI information 160 and/or risk indicator information 162 via a risk dashboard 164. For example, the risk dashboard 160 may be configured to provide static and/or active (e.g., real-time) visualizations of the KPI information 160 and/or the risk indicator information 162. As noted above, in some aspects, the risk dashboard 164, an associated CQ Engine, and/or an associated CQ Service may be configured to generate and/or implement one or more continuous queries for processing or otherwise receiving the KPI information 160. Additionally, in some aspects, the risk indicators 162 may be provided by the users 102 and/or generated automatically. Further, the risk indicator information 162 may be collected based at least in part on pre-existing queries that are applied upon request or the like.

A classification of some monitoring terms may be helpful for describing features of the risk management techniques including, "measure," "aggregation," "dimension," "business indicator," and "measurement." In some examples, a "measure" may include, but is not limited to, an attribute which can be measured and compared and/or will be utilized to evaluate how well a business is doing (e.g., defect resolution time). An "aggregation" may define a calculation performed on the "measure" and/or used in evaluation (e.g., average, maximum, minimum, etc.). Additionally, a "dimension" may define, if an aggregation is defined, the group on which the aggregation function is evaluated (e.g., when an "aggregation" is defined as "average order amount per category," the dimension may be "category"). In some examples, a "business indicator" may include, but is not limited to, attributes being utilized for analysis either as a "measure" or as a "dimension." Further, a "measurement" may include, but is not limited to, the point where the analysis data is captured (i.e., a sampling point).

In at least one non-limiting "Call Center" use case there may be three regional call centers operational for a shift of eight hours. Additionally, a call center manager's (i.e., a user's 102) performance may be gauged by the processing time for the calls as well as efficiency of dealing with customer escalation. Also, in some cases, calls can be waiting in the following status: in queue, in process, escalated, awaiting approval, closed, and dropped (i.e. closed without any ownership). Further, calls may be routed to different call centers based on capacity and wait times. Once a call center employee takes ownership, they can (1) resolve the case (2) escalate it or (3) send a resolution for management approval. As such, at any time, the call center manager 102 may wish to see the following information on the risk dashboard 164: incoming calls in queue at each call center by HOUR for the last eight hours; calls broken down by PRODUCT, CUSTOMER STATUS, and/or PRIORITY; and/or calls awaiting manager approval. Accordingly, the call center manager 102 may create the following KPIs: Call Processing Time (e.g., end to end for call completion); Calls Wait Time (e.g., time taken to wait in the queue before ownership transferred to an employee); and/or Calls Dropped (e.g., calls in queue but dropped before taken ownership/or less than some short time—like 15 seconds, for example—on the call).

For the Call Processing Time KPI, a user 102 may be enabled to design a KPI to measure the average call processing time, by day or hour, and automatically alert when a discrete period is outside of the norm. Additionally, the user 102 may be enabled to filter by specific location and/or customer status for a specific timeframe (day, hour, etc.). The Call Processing Time KPI can be displayed as a Collapsed List view, Pie chart view (each pie slice representing a call processing time for a specific location or customer category) or as a time series Bar chart where each bar represents the average call processing time for a specific amount of time or the like. Further, this KPI may allow comparison against a historical timeframe.

For the Calls Wait Time KPI, a user 102 may be enabled to design a KPI to measure the average call waiting time, by day or hour, and automatically alert when a discrete period is outside of the defined threshold. Additionally, the user 102 to filter by specific location and/or customer status for a specific timeframe (day, hour, default, etc.). The Call Wait Time can be displayed as a Collapsed List view, Pie chart view (each pie slice represents a call processing time for a specific location or customer category) or as a time series Bar chart where each bar represents the average call processing time for a specific day or hour.

For the Calls Dropped KPI, a user 102 may be enabled to design a KPI to measure the count of dropped calls, by day or hour, and automatically alert when a discrete period is outside of the norm. Additionally, this KPI may allow the user 102 to filter by specific location and/or customer status for a specific timeframe (day, hour, default, etc.). Dropped Calls can be displayed as a Collapsed List view. Further, this KPI may be actionable. The user 102 can configure specific actions to be invoked when a KPI is at risk or if a KPI violation occurs. Examples of actions include sending a customized email message, invoking a BPM taskflow, sending a customized text message (e.g., via SMS or MMS), and/or alerting the user 102 in any other known way.

In some examples, the user 102 may be able to create, edit, and/or save a real-time KPI utilizing a UI and/or one or more APIs of the risk management module 149. The user 102 may be able to select a data object, a data object column, and/or measure function for the real-time KPI. The user 102 can optionally specify a rolling window and update interval parameters function for the real-time KPI. The user 102 can optionally specify a description for the KPI measure function for the real-time KPI. The user 102 may also be able to specify a constant or historical threshold. For a constant threshold, the user 102 may be able to specify a constant threshold value for the real-time KPI. The user 102 may be able to specify a Constant, Percentage, and/or Standard Deviation range function for the real-time KPI. The user 102 can optionally configure the range boundaries for High, Medium, and Low ranges and optionally configure Alert Actions for each range function for the real-time KPI. Further, the user 102 can optionally specify a description for the KPI threshold function for the real-time KPI.

Additionally, in some aspects, the user 102 can optionally set a risk indicator by selecting a qualifying and/or pre-existing CQL query function for the real-time KPI. The user 102 can optionally specify a description for the KPI risk indicator function for the real-time KPI. The user 102 may also be able to create, edit, and/or save a tactical KPI using the UI (e.g., the risk dashboard 164) and/or one or more APIs of the risk management module 149. The user 102 may be able to select a group business query and assign it to a tactical KPI. The user 102 may be able to specify a refresh schedule for the tactical KPI. The user 102 can optionally specify a description for the KPI measure function for the real-time KPI. The user 102 may also be able to specify a constant threshold. For the constant threshold, the user 102 may be able to specify a constant threshold value for the tactical KPI. The user 102 may be able to specify a Constant, Percentage, and/or Standard Deviation range function for the tactical KPI. The user 102 can optionally configure the range boundaries for High, Medium, and Low ranges and optionally configure Alert Actions for each range function for the tactical KPI. The user 102 can optionally specify a description for the KPI threshold function for the tactical KPI. The user 102 may be able to create a KPI watch list business view. Further, the user 102 may be able to add the real-time KPIs to a KPI watch list.

In some examples, the risk management module 149 will support KPI as a first-class object. Business users 102 can create KPIs using the risk dashboard 164 (or other UI) and/or one or more APIs of the risk management module 149. KPIs can be bound to visualizations of the risk management module 149 such as, but not limited to, a KPI watch list and/or the risk dashboard 164. In some cases, the risk management module 149 will support two types of KPIs:

Real-time KPIs: Real-time KPIs may be monitored in real-time. This type of KPI may be modeled using a real-time CQL query. The risk management module 149 may be configured to maintain and monitor this KPI in real-time. A real-time KPI can have a Risk Indicator associated with it to monitor the risk level of that KPI in real-time. Examples of real-time KPIs are count of dropped calls, average hold time for Platinum customers etc.

Tactical KPIs: Tactical KPIs may be monitored at scheduled intervals which are specified by the business user (in some examples, only at scheduled intervals). This type of KPI may be defined using a SQL query that runs at specified intervals, e.g. every 24 hours, once a month etc. Tactical KPIs may be used to help users 102 track the progress of business goals. Examples of tactical KPIs are daily count of failed BPM workflow processes, monthly totals of completed sales deals, etc.

For a real-time KPIs, the risk management module 149 may be configured to generate and maintain the following queries:

(1) KPI Measure Query. In some examples, the KPI measure query may be generated based at least in part on a KPI data object, a selected data object column, an aggregation function, and/or sliding window parameters. For example, a business user seeking to design a KPI for monitoring average call processing times may select the measure data object, measure column, average aggregation function, and/or optional sliding window parameters. The risk management module 149 may automatically generate the following query:

```
SELECT
    AVG(callProcessingTime) as "KPI_Measure",
    SYSTIMESTAMP as "KPI_Timestamp",
    "AVERAGE_CALL_WAITING_TIME" as "KPI_Name"
FROM
    call_center_fact [RANGE 30 minutes ON callClosedTime
    SLIDE 10 minutes]
```

In some examples, each event emitted by the KPI measure query may contain a KPI name, a current KPI measure value, and/or a current timestamp. A Report Cache may register and start the KPI measure query after the KPI is bound to a visualization of the risk management module 149 (e.g., the risk dashboard).

(2) KPI Threshold Queries. In some examples, the business user 102 can classify KPI measure values into three different ranges: HIGH, MEDIUM, or LOW. This classification may be based at least in part on a comparison between the KPI measure and KPI threshold. The KPI measure may be tracked by the KPI measure query. The KPI threshold may be based at least in part on a CONSTANT VALUE and/or a HISTORICAL QUERY. Additionally, the risk management module 149 may generate a new CQL query for each threshold range by injecting a HAVING clause into the existing KPI measure query. Additionally, the comparison between the KPI measure and the KPI threshold can be based on three different types: CONSTANT, PERCENTAGE, or STANDARD DEVIATION. Further, the business user 102 can bind one or more Alert actions with each range.

For example, a business user 102 can define the HIGH threshold for the average call processing time KPI to capture call processing time measure values that exceed 120% of a specified constant value of 25 seconds (or more or less). The HIGH threshold may be modeled using a "Group Filter" as shown below:

```
<GroupFilter>
    <Branch type="ALL">
        <Entry type="GT">
            <Node ID="AVG(_callProcessingTime)_1" operation=
            "AVG" type="AGGREGATE">_callProcessigTime</Node>
            <Node type="INTEGER">30</Node>
        </Entry>
    </Branch>
</GroupFilter>
```

Using the above group filter and user-specified KPI measure query, the risk management module 149 may be able to generate the following KPI Threshold query:

```
SELECT
    AVG(callProcessingTime) as "KPI_Measure",
    SYSTIMESTAMP as "KPI_Timestamp",
    "AVERAGE_CALL_WAITING_TIME" as "KPI_Name",
    "HIGH" as "KPI_Range"
FROM
    call_center_fact
HAVING
    AVG(callProcessingTime) > 30
```

In some examples, each event emitted by the KPI threshold query may contain a KPI name, a current KPI measure value, a current timestamp, and/or a KPI range name (e.g. HIGH, MEDIUM or LOW). In some aspects, all actions associated with each KPI range may be registered with an Alert Engine of the risk management module 149 at the instant that KPI is saved. Further, the KPI threshold CQL queries will be registered and started at the instant the KPI is saved.

(3) KPI Risk Indicator Queries. In some examples, a Risk Indicator 162 may be a special type of CQL query that drives the behavior of the selected KPI. For example, a CQL query to detect a consecutive increase of 20% in the volume of incoming calls may be an appropriate risk indicator 162 for the average call processing time KPI, since there is a strong co-relation between the volume of incoming calls and the call processing time. Risk Indicator queries may be predefined CQL queries. Each event emitted by a risk indicator query may contains a KPI name, a current KPI measure value, a current timestamp, and/or a KPI range name (e.g. HIGH, MEDIUM or LOW). Further, the KPI risk indicator queries may be pre-existing CQL queries and/or may be selected automatically by the risk management module 149 or another module of the service provider computers 106 based at least in part on correlation and/or KPI information 160. The Report Cache will simply listen to the event output of these queries.

Additionally, in some examples, Risk indicators 162, unlike performance indicators 160, may measure the riskiness of a business operation. It may provide an early warning sign to identify events that may harm the existing processes. Additionally, operations staff (i.e., users 102) may use a risk dashboard 164 to monitor business events as they occur, and the focus of risk dashboard 164 may be to display what is happening now. A "detect-and-respond" dashboard may be utilized often (e.g. call centers, logistics operations), and is action oriented. This type of dashboard typically utilizes alerts to notify users about exception conditions as they happen, which in turn, may influence their KPIs. Alerts can be used to send emails to one or more recipients, but can also appear on a dashboard via an icon next to the relevant metric. Visualizations may include a real time KPI watch list, geo map, and/or tree map, as well as the ability to drill down and take actions.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EE-PROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
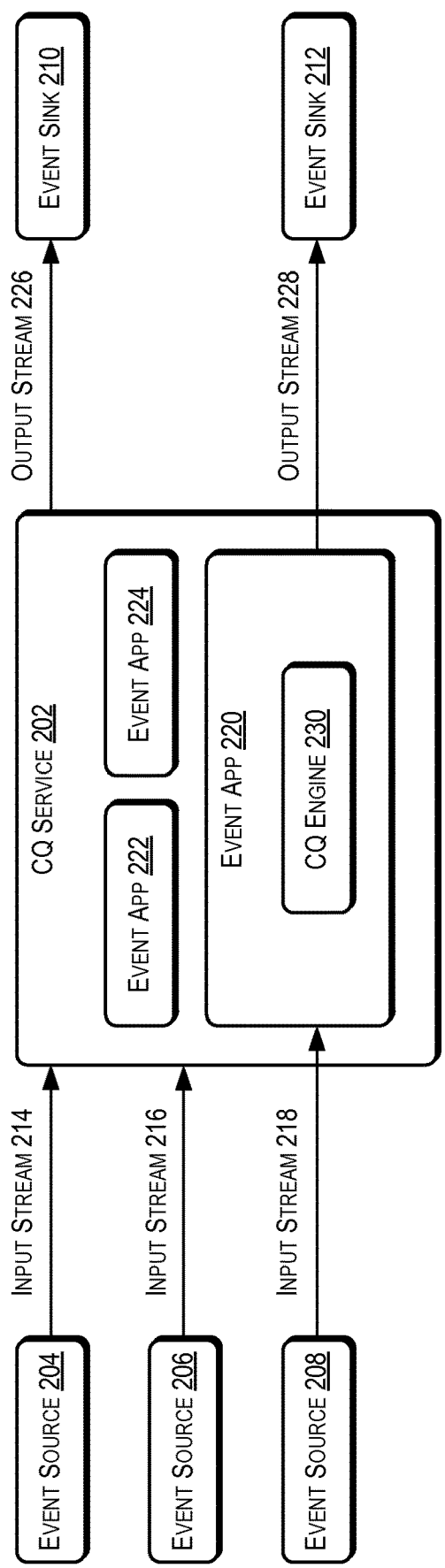
FIG. 2 is a simplified block diagram illustrating at least some features of the techniques for managing real-time business event analysis and monitoring described herein, according to at least one example.

FIG. 2 depicts a simplified high level diagram of an event processing system 200 that may incorporate an embodiment of the present invention. Event processing system 200 may comprise one or more event sources (204, 206, 208), an event processing server (EPS) 202 that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives an input event stream 214 from event source 204, a second input event stream 216 from event source 206, and a third event stream 218 from event source 208. One or more event processing applications (220, 222, and 224) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs an output event stream 226 to event sink 210, and a second output event stream 228 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 220. As shown in FIG. 2, event processing application 220 is configured to listen to input event stream 218, execute a query 230 comprising logic for selecting one or more notable events from input event stream 218, and output the selected notable events via output event stream 228 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 220 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the Continuous Query Language (CQL) provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:
(1) One or more adapters that interface directly to the input and output stream and relation sources and sinks Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.
(2) One or more channels that act as event processing endpoints. Among other things, channels are responsible for queuing event data until the event processing agent can act upon it.
(3) One or more application processors (or event processing agents) are configured to consume normalized event data from a channel, process it using queries to select notable events, and forward (or copy) the selected notable events to an output channel.
(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 200 depicted in FIG. 2 may have other components than those depicted in FIG. 2. Further, the embodiment shown in FIG. 2 is only one example of a system that may incorporate an embodiment of the invention. In some other embodiments, system 200 may have more or fewer components than shown in FIG. 2, may combine two or more components, or may have a different configuration or arrangement of components. System 200 can be of various types including a personal computer, a portable device (e.g., a mobile telephone or device), a workstation, a network computer, a mainframe, a kiosk, a server, or any other data processing system. In some other embodiments, system 200 may be configured as a distributed system where one or more components of system 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3:
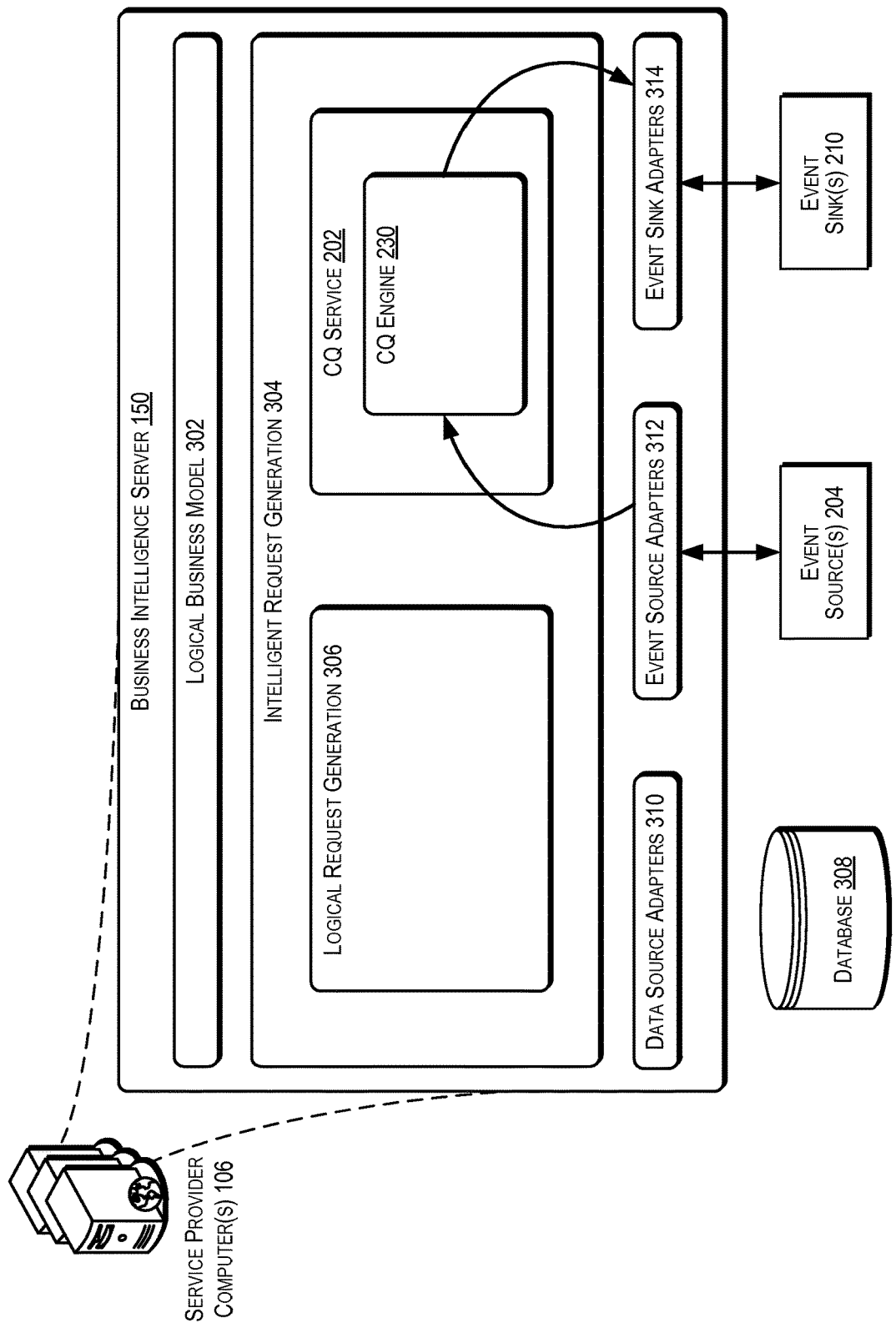
FIG. 3 is another simplified block diagram illustrating at least some features of the techniques for managing real-time business event analysis and monitoring described herein, according to at least one example.

FIG. 3 illustrates a simplified block diagram 300 with which features of the techniques for managing real-time business event analysis and monitoring may be described. As noted above, in some examples, a business intelligence server 150 may be executed by the service provider computers 106 of FIG. 1 and may include, among other things, one or more CQ Services 202 that may implement one or more CQ Engines 230 Additionally, in some examples, the BI server 150 may also include a logical business model module 302, an intelligent request generation module 304, and/or a logical request generation module 306. The some examples, the logical request generation module 306 may configured to receive, process, and/or generate one or more logical requests and/or one or more tactical queries for querying against a database 308. Further, in some examples, the BI server 150 may also be configured to include one or more adapters such as, but not limited to, one or more data source adapters 310, one or more event source adapters 312, and/or an event sink adapters 314. In some examples, the data source adapters 310 may be configured to manage communication between the logical request generation module 306 and one or more databases 308. Additionally, the event source adapters 312 may be configured to manage communication between the CQ Engine 230 and one or more event sources 204, as described with reference to FIG. 2. Further, the event sink adapters 314 may be configured to manage communication between the CQ Engine 230 and one or more event sinks 210.

In one non-limiting use case of implementing the CQ Service 202 within the BI server 150, the service provider computers 106 may receive a logical request. For example, a logical request may include a request from a user to alert them of when some event occurs (e.g., "alert me when bug 7654321 goes from 11 to 80). At this stage, the service provider computers 106 may pass this logical request to the logical business model module 302, where the logical business model module 302 may be configured to issue a logical SQL to extend to a continuous query. For example, a continuous query CQ1 may be created as:

```
Select BugId, LastUpdatedBy
From BUGDB
Where BugId=7654321 and
New_value(status)=80 and
Old_value(status)=11
```

Additionally, in some examples, based at least in part on the non-limiting use case discussed above, the logical request generation module 306 may then be configured to delegate the continuous query CQ1 to the CQ Service module 202, where the CQ Service module 202 may setup a Change Data Capture on a BUGDB table or other database associated with the event source adapters 312 in communication with the one or more event sources 204. In some aspects, CQ Service 202 may then set up event sinks 210 by setting up an alert destination and/or an alert output table associated with the event sink adapters 314. Additionally, in some examples, CQ Service 202 may then implement the CQ Engine 230 to issue CQL DDLs and/or generate a continuous query to query against an event stream. The CQ Service 202 may then receive one or more CDC events from the event source adapters 312 based at least in part on data being pushed to the event processor and/or CQ Engine 230 via the event sources 204 and through the event source adapters 312. The CQ Service 202 may then receive output events from the CQ Engine 230 as the output events are pushed to the event sinks 210 through the event sink adapters 314. As such, the event sink adapters 314 may receive the output events. Further, an output table may be utilized and/or an alert may be sent, as discussed above. A user may then receive the alert may be enable to drill down into a visualization provided via a UI or other interface.

Figure 4:
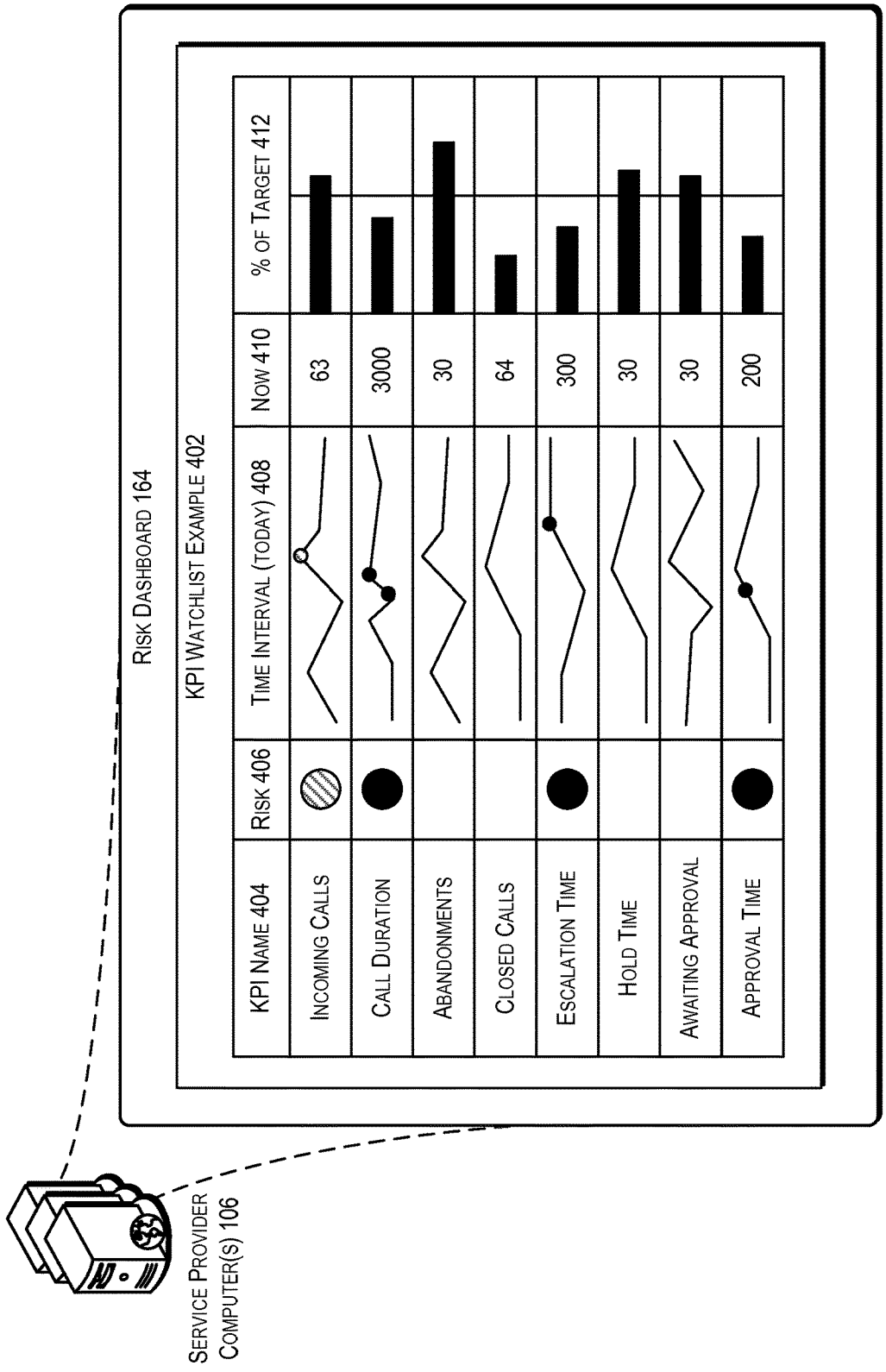
FIG. 4 is a simplified block diagram illustrating at least some features of the techniques for managing risk with continuous queries described herein, according to at least one example.

FIG. 4 depicts a simplified block diagram 300 for illustrating at least some features of the techniques for managing risk with continuous queries, according to one example. In FIG. 4, the service provider computers 106 are again, here implementing or otherwise providing the risk dashboard 164 described with reference to FIG. 1. In addition to as described above, the risk dashboard 164 may also be configured to provide at least one KPI watch list example 402. As such KPIs can be added to one or more special visualizations (e.g., the KPI watch list examples 402). In some examples, the watch list view may allow business users to monitor the state of various KPIs (e.g., in real-time). For each KPI, the KPI watch list example 402 may display the following information: KPI Name 404, Risk Status 406, Time Interval 408, Measured Value (e.g., "Now") 410, and/or Percentage of Target 412. The PKI Name 404 may include a unique string name provided by the user or automatically generated by the service provider computers 106. The Risk Status 406 may include a circle when a risk indicator is relevant, the circles may be of different shades, colors, or fill designs to indicate different levels of risk or concern (e.g., normal, medium, high, low, etc.). The Time Interval (i.e., "Today") 408 may be a trend-line marked up with risk points and/or a bounded list of the latest number measure values (e.g., the last ten data points or the like). Additionally, the Now 410 column may indicate the current measure value (e.g., the latest measure value). Further, the Percentage of Target 412 column may indicate a normalized comparison of Measure and Target (e.g., the latest measure-target value pair).

In some examples, a Report Cache may maintain a snapshot of KPIs in a Coherence data table. This data table may maintain the snapshot data model for each KPI. An example of this Coherence data table is shown below:

| KPI ID | Risk Status | List of Measure Values | Measure | {Measure, Target} |
|---|---|---|---|---|
| $KPI_1$ | HIGH | {10, 20, 40, 80, 160} | 160 | {160, 200} |
| $KPI_2$ | LOW | {10, 10, 15, 10, 12} | 12 | {12, 50} |
| ... | ... | ... | ... | ... |

In some aspects, at Report Cache bootstrap time, each KPI may be added as a new row in the above table. The value columns for each KPI may be initially NULL. After a KPI object is bound to visualization (e.g. the KPI watch list 402 or the like):

The report Cache may register and run the KPI measure CQL.
  The report Cache may start listening to the event output from the KPI risk indicator CQL.
  The CQL query event output may be captured in the KPI row in the above Coherence data table.

This Coherence data table may serve as the data model for a KPI watch list view 402. The many-to-many association between KPIs and KPI watch lists may be captured in a map. For each KPI, there may be a list of all the KPI watch lists that it has been added to. For example, suppose there are three KPIs: KPI1, KPI2 and KPI3 and two KPI watch lists: Watchlist1 and Watchlist2. Let Watchlist1 contain KPI1 and Watchlist2 contain KPI1 and KPI2. The map between KPIs and KPI watch lists may be as follows:
$Watchlist_1 \rightarrow KPI_1$
$Watchlist_2 \rightarrow KPI_1, KPI_2$ In some aspects, each time a CQL (e.g. measure CQL, risk indicator CQLs) is associated with KPI1 generating a new event, the Report Cache will look up the map to determine which KPI watch lists are affected, and may update the row corresponding to KPI1 in the Coherence data table, and may generate a corresponding change list event for Watchlist1 and Watchlist2. Similarly, for each new event generated by the CQLs for KPI2, the Report Cache may update the row corresponding to KPI2 in the Coherence data table, and may generate a corresponding change list event for Watchlist2.

Figure 5:
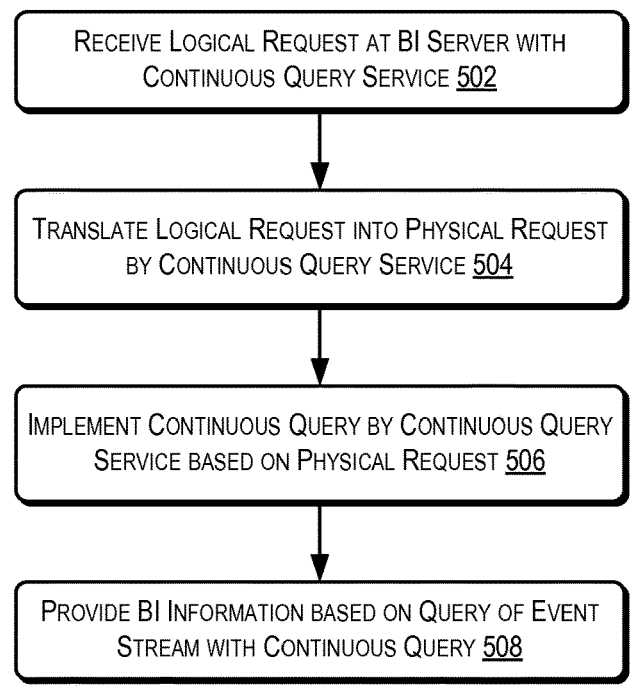
FIG. 5 is a simplified process flow illustrating at least some features of the management of real-time business event analysis and monitoring techniques described herein, according to at least one example.
Figure 6:
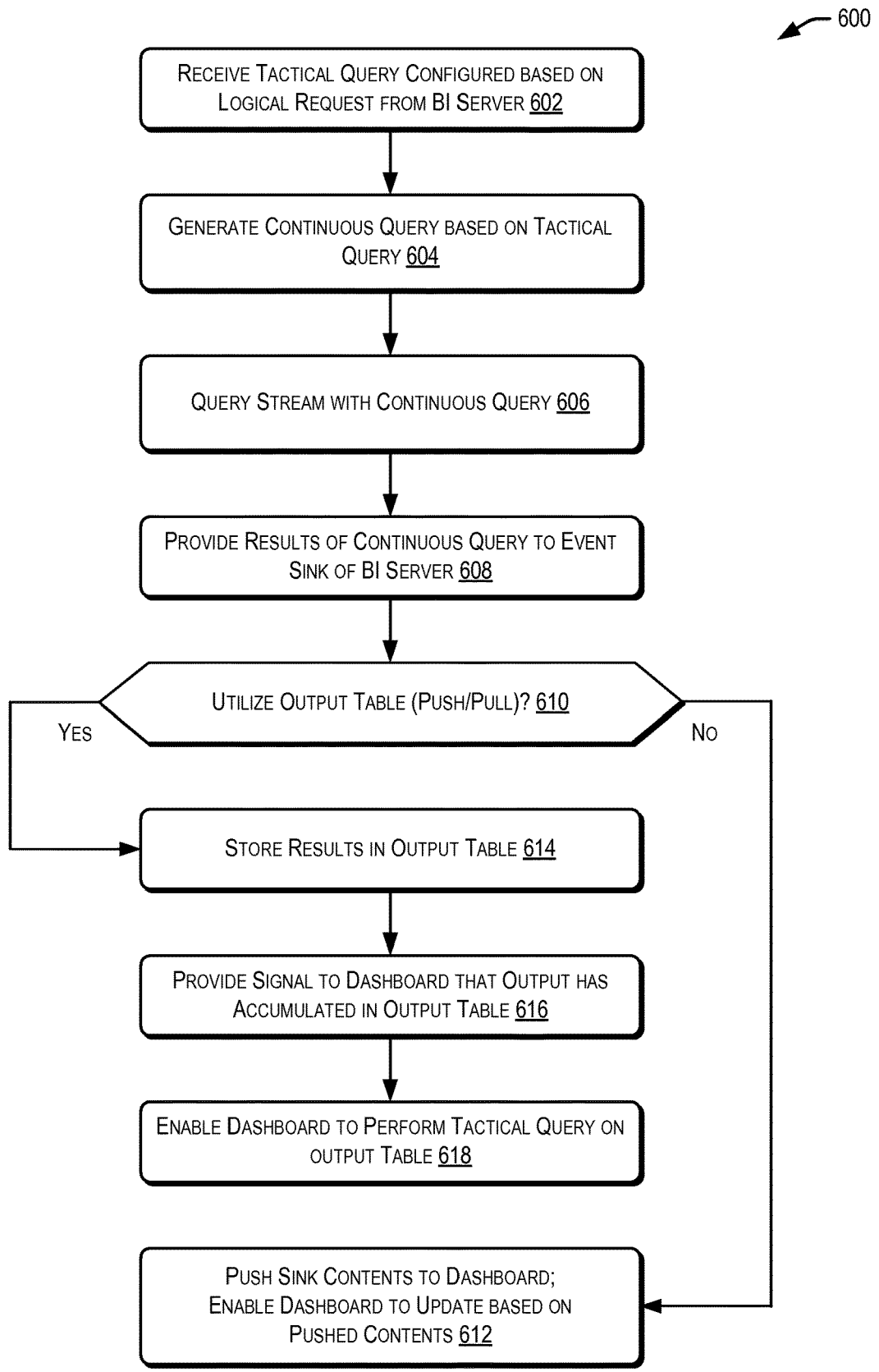
FIG. 6 is another simplified process flow illustrating at least some features of the management of real-time business event analysis and monitoring techniques described herein, according to at least one example.

FIGS. 5 and 6 illustrate example flow diagrams showing respective processes 500 and 600 for implementing the management of real-time business event analysis and monitoring techniques described herein. These processes 500 and 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the CQ Service module 148 of FIG. 1) shown in FIGS. 1-3 may perform the process 500 of FIG. 5. The process 500 may begin by including receiving a logical request at a BI server configured with a continuous query service (i.e., CQ Service) at 502. As noted a logical request may include a request from user in a logical form (e.g., "alert me when x event occurs," or the like) or it may be a tactical query (e.g., a SQL query). At 504, the process 500 may include translating the logical request into a physical request by the continuous query service. As noted, in some examples, the translation may include converting a tactical query to a continuous query. At 506, the process 500 may include implementing the continuous query, by the continuous query service, based at least in part on the physical request (e.g., post-translation). Further, the process 500 may end at 508, where the process 500 may include providing BI information to a user based at least in part on querying an event stream with the generated continuous query.

FIG. 6 illustrates an example flow diagram showing process 600 for implementing the management of real-time business event analysis and monitoring techniques described herein. The one or more service provider computers 106 (e.g., utilizing at least the CQ Service module 148 of FIG. 1) shown in FIGS. 1-3 may perform the process 600 of FIG. 6. The process 600 may begin at 602 by including receiving a tactical query configured based at least in part on a logical request from a BI server. In some examples, the logical request may be received by a BI server that includes a CQ service module and passed to the CQ service module, by the BI server, for processing. At 604, the process 600 may include generating a continuous query based at least in part on a tactical query. The tactical query (e.g., a SQL query) may be generated based at least in part on the logical request. At 606, the process 600 may include querying a stream with the continuous query. At 608, the process 600 may include providing results of the continuous query to an event sink of the Bi server.

Additionally, in some examples, the process 600 may include determining whether to utilize an output table (and/or whether to push or pull the event output from the continuous query) at 610. If it is determined not to utilize an output table at 610, the process 600 may end at 612 by including pushing the sink contents to a dashboard and enabling the dashboard to update (i.e., refresh) based at least in part on the pushed contents. Alternatively, if the process determined at 610 to utilize an output table, the process 600 may include storing the results in the output table at 614. At 616, the process 600 may include providing a signal to the dashboard indicating that output events have accumulated in the output table. Further, the process 600 may end at 618, where the process 600 may enable the dashboard to perform a tactical query on the output table to receive the event output data from the previously implemented continuous query.

Figure 7:
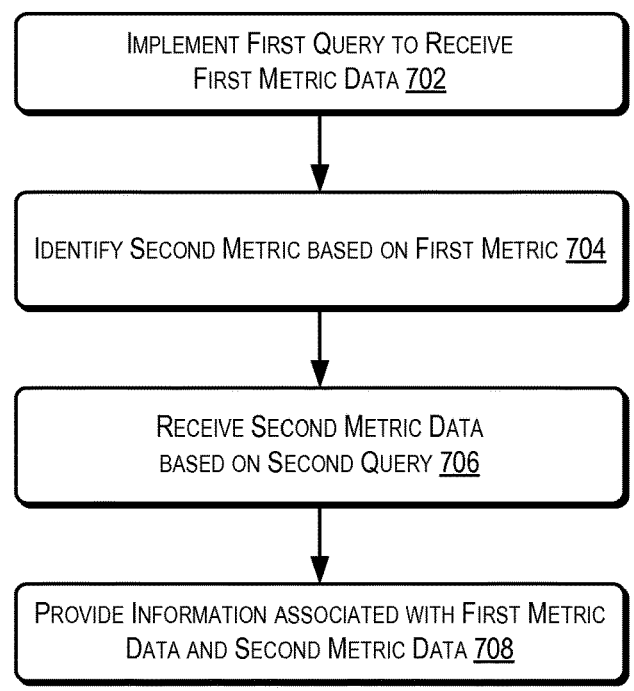
FIG. 7 is a simplified process flow illustrating at least some features of the techniques for managing risk with continuous queries described herein, according to at least one example.
Figure 8:
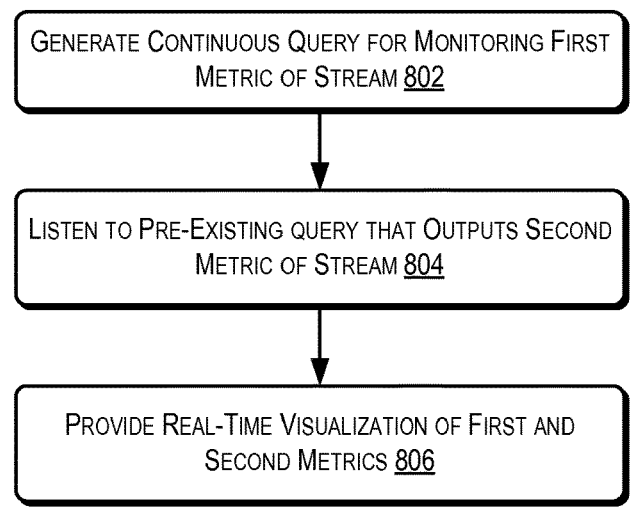
FIG. 8 is another simplified process flow illustrating at least some features of the techniques for managing risk with continuous queries described herein, according to at least one example.
Figure 9:
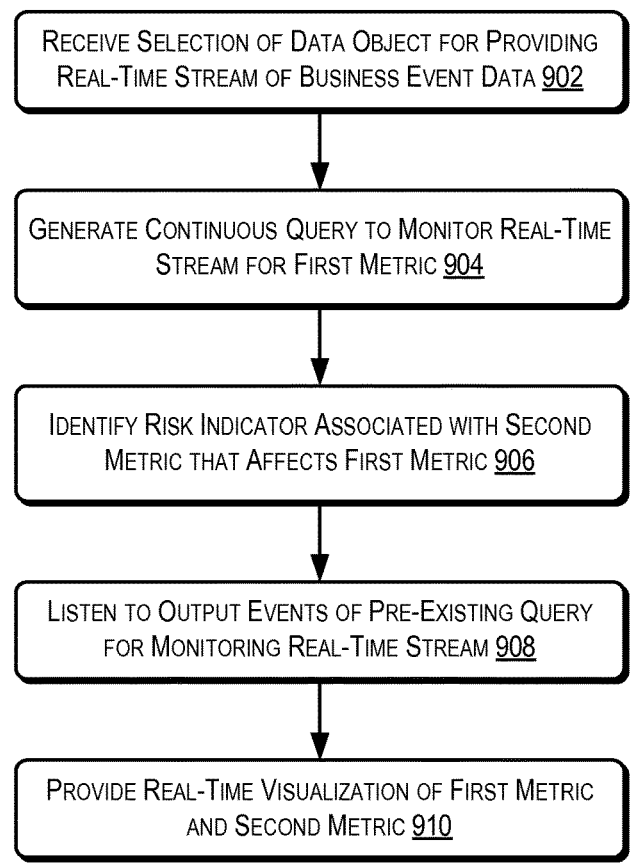
FIG. 9 is another simplified process flow illustrating at least some features of the techniques for managing risk with continuous queries described herein, according to at least one example.

FIGS. 7-9 illustrate example flow diagrams showing respective processes 700, 800, and 900 for implementing the techniques for managing risk with continuous queries described herein. These processes 700, 800, 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the risk management module 149 of FIG. 1) shown in at least FIG. 1 may perform the process 700 of FIG. 7. The process 700 may begin by including implementing a first query to receive a first metric at 702. At 704, the process 700 may include identifying a second metric based at least in part on the first metric. The first metric may include a KPI and the second metric may include a risk indicator associated with the KPI. At 706, the process 700 may include receiving the second metric data based at least in part on a second query. Further, the process 700 may end at 708 where the process 700 may include providing information associated with the first metric and the second metric (e.g., to a dashboard or other UI).

FIG. 8 illustrates an example flow diagram showing process 800 for implementing the techniques for managing risk with continuous queries described herein. The one or more service provider computers 106 (e.g., utilizing at least the risk management module 149 of FIG. 1) shown in at least FIG. 1 may perform the process 800 of FIG. 8. The process 800 may begin at 802 by including generating a continuous query for monitoring a first metric of a stream. As noted above with reference to process 700, the first metric may be a KPI. At 804, the process 800 may include listening to a pre-existing query that outputs a second metric of the stream. Again, the second metric may be a risk indicator associated with the KPI. Further, the process 800 may end at 806 where the process 800 may include providing a real-time visualization of the first and/or second metrics.

FIG. 9 illustrates an example flow diagram showing process 900 for implementing the techniques for managing risk with continuous queries described herein. The one or more service provider computers 106 (e.g., utilizing at least the risk management module 149 of FIG. 1) shown in at least FIG. 1 may perform the process 900 of FIG. 9. The process 900 may begin by including receiving a selection of a data object for providing real-time stream of business event data at 902. At 904, the process 900 may include generating a continuous query to monitor the real-time stream for a first metric (e.g., KPI information). At 906, the process 900 may also include identifying a risk indicator associated with a second metric that affects the first metric. At 908, the process 900 may include listening to output events of a pre-existing query for monitoring a real-time stream. Further, the process 900 may end at 910 where the process 900 may include providing a real-time visualization of the first metric and/or the second metric. The second metric may include the risk indicator or information identifying and/or quantifying the risk indicator.

Illustrative methods and systems for implementing the techniques for managing real-time business event analysis and monitoring and/or the techniques for managing risk with continuous queries are described above. Some or all of these systems and methods may, but need not, be implemented at least partially by architectures and processes such as those shown at least in FIGS. 1-9 above.

Figure 10:
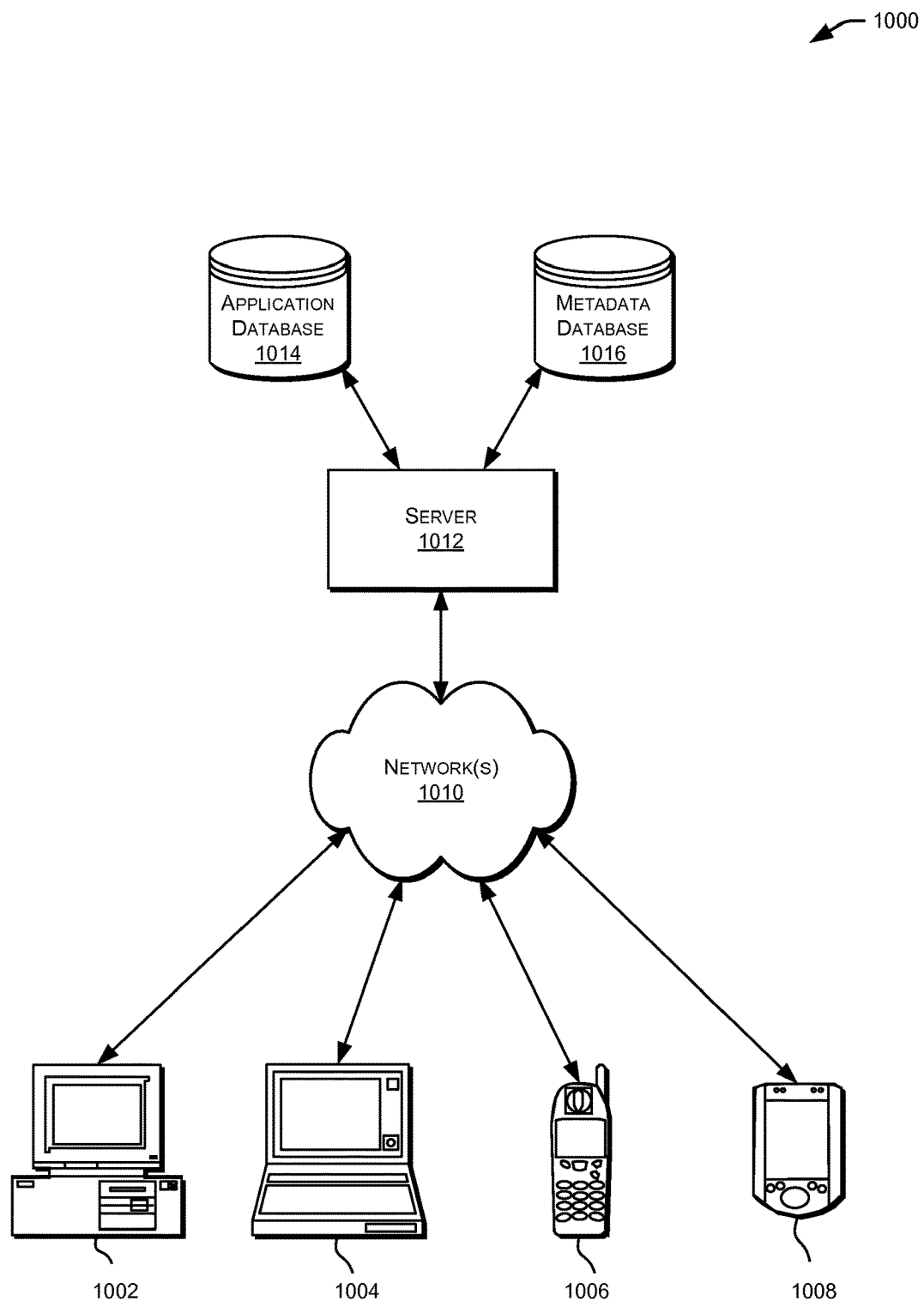
FIG. 10 is a simplified block diagram illustrating components of a system environment that may be used in accordance with an embodiment of the techniques for managing real-time business event analysis and monitoring and/or techniques for managing risk with continuous queries described herein, according to at least one example.

FIG. 10 is a simplified block diagram illustrating components of a system environment 1000 that may be used in accordance with an embodiment of the present disclosure. As shown, system environment 1000 includes one or more client computing devices 1002, 1004, 1006, 1008, which are configured to operate a client application such as a web browser, proprietary client (e.g., Oracle Forms), or the like over one or more networks 1010 (such as, but not limited to, networks similar to the networks 108 of FIGS. 1 and 3). In various embodiments, client computing devices 1002, 1004, 1006, and 1008 may interact with a server 1012 over the networks 1010.

Client computing devices 1002, 1004, 1006, 1008 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1002, 1004, 1006, and 1008 may be any other electronic device, such as a thin-client computer, Internet-enabled gaming system, and/or personal messaging device, capable of communicating over a network (e.g., network 1010 described below). Although exemplary system environment 1000 is shown with four client computing devices, any number of client computing devices may be supported. Other devices such as devices with sensors, etc. may interact with server 1012.

System environment 1000 may include networks 1010. Networks 1010 may be any type of network familiar to those skilled in the art that can support data communications using any of a variety of commercially-available protocols, including without limitation TCP/IP, SNA, IPX, AppleTalk, and the like. Merely by way of example, network 1010 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1000 also includes one or more server computers 1012 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1000 may also include one or more databases 1014, 1016. Databases 1014, 1016 may reside in a variety of locations. By way of example, one or more of databases 1014, 1016 may reside on a non-transitory storage medium local to (and/or resident in) server 1012. Alternatively, databases 1014, 1016 may be remote from server 1012, and in communication with server 1012 via a network-based or dedicated connection. In one set of embodiments, databases 1014, 1016 may reside in a storage-area network (SAN) familiar to those skilled in the art. Similarly, any necessary files for performing the functions attributed to server 1012 may be stored locally on server 1012 and/or remotely, as appropriate. In one set of embodiments, databases 1014, 1016 may include relational databases, such as databases provided by Oracle, that are adapted to store, update, and retrieve data in response to query-language-formatted commands.

Figure 11:
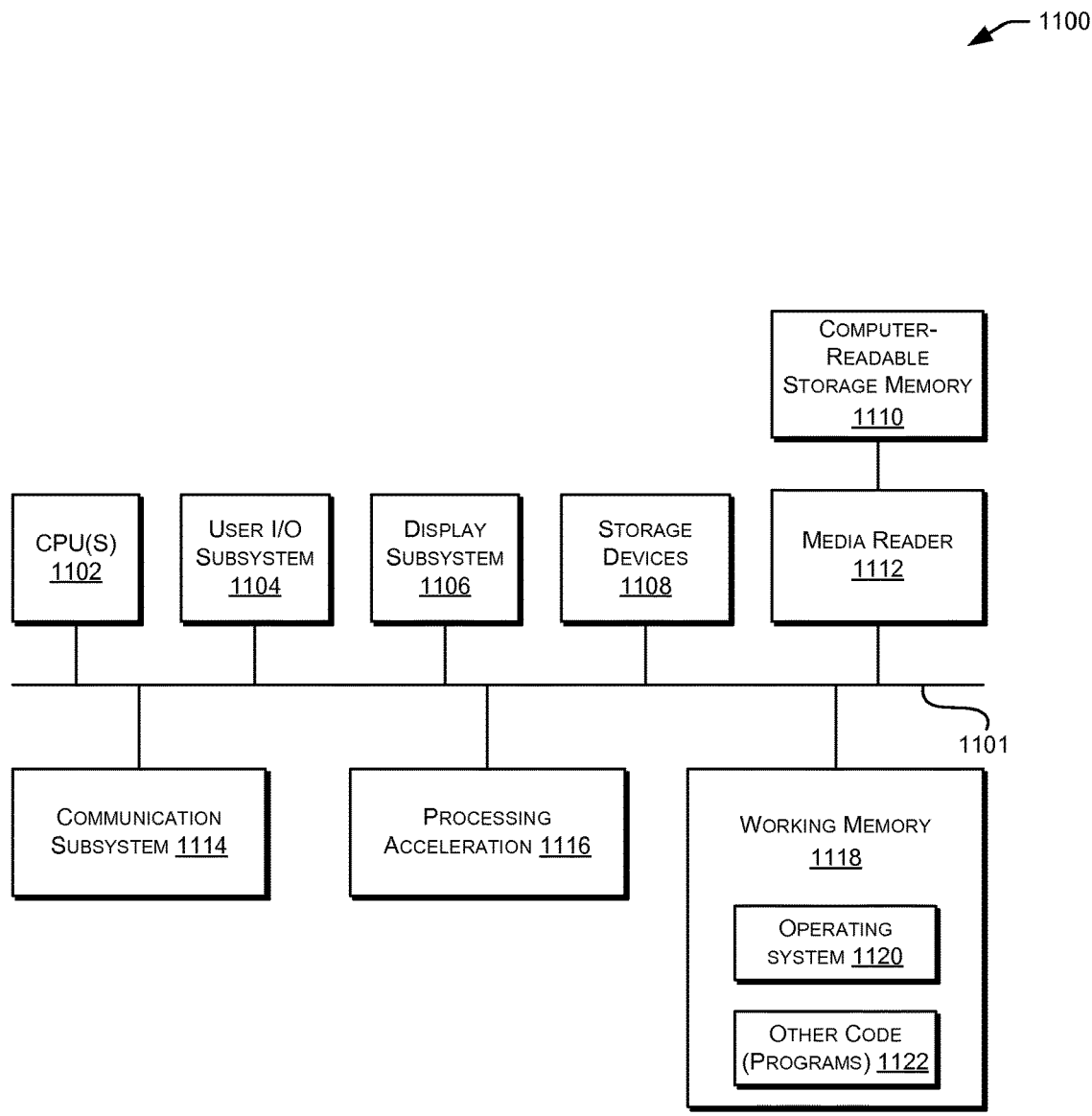
FIG. 11 is a simplified block diagram illustrating a computer system that may be used in accordance with embodiments of the techniques for managing real-time business event analysis and monitoring and/or techniques for managing risk with continuous queries described herein, according to at least one example.

FIG. 11 is a simplified block diagram of a computer system 1100 that may be used in accordance with embodiments of the present disclosure. For example service provider computers 106 may be implemented using a system such as system 1100. Computer system 1100 is shown comprising hardware elements that may be electrically and/or communicatively coupled via a bus 1201. The hardware elements may include one or more central processing units (CPUs) 1102, one or more input devices 1104 (e.g., a mouse, a keyboard, etc.), and one or more output devices 1106 (e.g., a display device, a printer, etc.). Computer system 1100 may also include one or more storage devices 1108. By way of example, the storage device(s) 1108 may include devices such as disk drives, optical storage devices, and solid-state storage devices such as a random access memory (RAM) and/or a read-only memory (ROM), which can be programmable, flash-updateable and/or the like.

Computer system 1100 may additionally include a computer-readable storage media reader 1112, a communications subsystem 1114 (e.g., a modem, a network card (wireless or wired), an infra-red communication device, etc.), and working memory 1118, which may include RAM and ROM devices as described above. In some embodiments, computer system 1100 may also include a processing acceleration unit 1116, which can include a digital signal processor (DSP), a special-purpose processor, and/or the like.

Computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. Communications system 1114 may permit data to be exchanged with network 1112 and/or any other computer described above with respect to system environment 1100.

Computer system 1100 may also comprise software elements, shown as being currently located within working memory 1118, including an operating system 1120 and/or other code 1122, such as an application program (which may be a client application, Web browser, mid-tier application, RDBMS, etc.). In an exemplary embodiment, working memory 1118 may include executable code and associated data structures used for relying party and open authorization-related processing as described above. It should be appreciated that alternative embodiments of computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
    a memory storing a plurality of instructions; and
    one or more processors configured to access the memory, wherein the one or more processors are further configured to execute the plurality of instructions to at least:
        receive, at a business intelligence server configured with a continuous query service, a request from a user in a natural language form, the request identifying an alert to be provided in response to identification of a business event pattern over time that predicts a risk metric, the risk metric associated with a key performance indicator of a plurality of key performance indicators identified in the request, the business event pattern over time corresponding to a change over time in a business event driving metric that measures business event data, the change over time predicting, based at least in part on a regression of outcomes to the business event data, the risk metric, the request further configuring a percentage range function for the key performance indicator, and the request further configuring range boundaries and the alert for the percentage range function for the key performance indicator;
        translate, by the continuous query service, the request that is in the natural language form into a continuous query for at least the key performance indicator;
        generate a relation based at least in part on a stream of the business event data that includes the business event pattern over time;
        query the relation using the continuous query to receive data corresponding to the business event pattern over time and the key performance indicator associated with the business event data;
        provide the data corresponding to the business event pattern over time and the key performance indicator to an event sink of the business intelligence server;
        enable output events of the continuous query, from the event sink, to be stored in a plurality of output tables, each output table of the plurality of output tables corresponding to a respective key performance indicator watch list user interface (UI) of a plurality of key performance indicator watch list user interfaces (UIs), each respective key performance indicator watch list UI configured to display real-time data of each respective key performance indicator;
        map each of the plurality of key performance indicator watch UIs to multiples of the plurality of key performance indicators;
        for each output event of the continuous query:
            determine affected key performance indicators;
            identify, based at least in part on the mapping, respective key performance indicator watch list UIs to be updated with the real-time data; and
            update an entry in each corresponding output table of the plurality of output tables;
        generate the alert, for a particular key performance indicator watch list UI, according to the updated entry in the corresponding output table being over a threshold corresponding to the affected key performance indicators;
        provide business intelligence information associated with the business event pattern over time from the event sink to a client device for presentation as part of the alert in a risk dashboard UI comprising a visualization of at least the particular key performance indicator watch list UI; and
        update the particular key performance indicator watch list UI in the risk dashboard UI based at least in part on subsequent output events of the continuous query.

2. The system of claim 1, wherein the one or more processors are further configured to execute the plurality of instructions to at least implement a continuous query engine as part of the continuous query service.

3. The system of claim 2, wherein the continuous query engine is configured to receive the business event data of the event data stream from the business intelligence server.

4. The system of claim 1, wherein the business intelligence server is configured to manage the business intelligence information associated with the user.

5. The system of claim 4, wherein the business intelligence information includes at least one of a result of the continuous query or the alert configured to identify the result of the continuous query.

6. The system of claim 1, wherein the risk dashboard user interface comprises a graphical user interface displaying a trend line of real-time measurements of the key performance indicator corresponding to the data and based at least in part on the continuous query, the continuous query comprising a real-time continuous query.

7. The system of claim 1, wherein the request includes at least a tactical query generated based at least in part on a request from the user for the business intelligence information.

8. The system of claim 7, wherein the tactical query is received by the continuous query service from a logical business model of the business intelligence server.

9. The system of claim 1, wherein the one or more processors are further configured to execute the plurality of instructions to:
- identify a second metric based at least in part on the risk metric associated with the key performance indicator; and
- receive data associated with the second metric based at least in part on a second query.

10. The system of claim 9, wherein:
- the second metric includes information quantifying the risk metric and affecting the key performance indicator; and
- the one or more processors are further configured to execute the plurality of instructions to listen to output events of a pre-existing query for monitoring the stream.

11. The system of claim 1, wherein a report cache:
- runs the continuous query for the key performance indicator;
- listens to output of the continuous query for the key performance indicator; and
- maintains a Coherence data table comprising key performance indicator information, the Coherence data table serving as a data model for a watch list view of the risk dashboard user interface.

12. The system of claim 11:
- wherein an association between the key performance indicator and the watch list is maintained in a map; and
- wherein, responsive to a new continuous query event associated with the key performance indicator, the report cache looks up the map to determine whether the watch list is affected; and
- wherein, responsive to the watch list being affected, the report cache updates the Coherence data table and generates a change list event for the watch list.

13. A non-transitory computer-readable memory storing a plurality of instructions executable by one or more processors, the plurality of instructions comprising:
- instructions that cause the one or more processors to receive, by a continuous query service, a tactical query from a business intelligence server, the tactical query configured based at least in part on a request from a user in a natural language form, the request identifying an alert to be provided in response to identification of a pattern over time in business event data that predicts a risk metric, the risk metric associated with a key performance indicator of a plurality of key performance indicators identified in the request, the request further configuring a percentage range function for the key performance indicator, and the request further configuring range boundaries and the alert for the percentage range function for the key performance indicator;
- instructions that cause the one or more processors to generate, by the continuous query service, a continuous query for at least the key performance indicator configured to query against a stream of the business event data for at least the key performance indicator, the continuous query based at least in part on the tactical query and translated from the natural language form;
- instructions that cause the one or more processors to generate a relation based at least in part on the stream of business event data that includes the pattern over time in the business event data;
- instructions that cause the one or more processors to query the relation using the continuous query to receive data corresponding to the pattern over time in business event data and the key performance indicator associated with the business event data;
- instructions that cause the one or more processors to provide the data corresponding to the pattern over time in business event data and the key performance indicator to an event sink of the business intelligence server;
- instructions that cause the one or more processors to enable output events of the continuous query, from the event sink, to be stored in a plurality of output tables, each output table of the plurality of output tables corresponding to a respective key performance indicator watch list user interface (UI) of a plurality of key performance indicator watch list user interfaces (UIs), each respective key performance indicator watch list UI configured to display real-time data of each respective key performance indicator;
- instructions that cause the one or more processors to map each of the plurality of key performance indicator watch lists UIs to multiples of the plurality of key performance indicators;
- instructions that cause the one or more processors to, for each output event of the continuous query:
  - determine affected key performance indicators;
  - identify, based at least in part on the mapping, respective key performance indicator watch list UIs to be updated with the real-time data; and
  - update an entry in each corresponding output table of the plurality of output tables;
- instructions that cause the one or more processors to generate the alert, for a particular key performance indicator watch list UI, according to the updated entry in the corresponding output table being over a threshold corresponding to the affected key performance indicators;
- instructions that cause the one or more processors to provide business intelligence information associated with the business event pattern over time from the event sink to a client device for presentation as part of the alert in a risk dashboard UI comprising a visualization of at least the particular key performance indicator watch list UI; and
- instructions that cause the one or more processors to update the particular key performance indicator watch list UI in the risk dashboard UI based at least in part on subsequent output events of the continuous query.

14. The non-transitory computer-readable memory of claim 13, wherein the plurality of instructions further comprises instructions that cause the one or more processors to enable output of the continuous query, from the event sink, to be stored in an output table, wherein the alert is provided based at least in part on the output table.

15. The non-transitory computer-readable memory of claim 14, wherein the plurality of instructions further comprises:
- instructions that cause the one or more processors to provide a signal to the risk dashboard user interface that the output of the continuous query has accumulated in the output table;
- instructions that cause the one or more processors to enable the risk dashboard user interface to perform a second tactical query to refresh the risk dashboard user interface with the output accumulated in the output table.

16. The non-transitory computer-readable memory of claim 15, wherein the plurality of instructions further comprises:
  instructions that cause the one or more processors to push contents of the event sink to the output table; and
  instructions that cause the one or more processors to enable the risk dashboard user interface to incrementally update a view of the risk dashboard user interface based at least in part on the pushed contents of the output table.

17. The non-transitory computer-readable memory of claim 13, wherein the business event pattern over time corresponds to a change over time in a business event driving metric, the change over time predicting, based at least in part on a regression of outcomes to the business event data, the risk metric associated with the key performance indicator.

18. A computer-implemented method, comprising:
  implementing, by a business intelligence server, a continuous query service;
  receiving, by the continuous query service, a tactical query from the business intelligence server, the tactical query configured based at least in part on a request from a user in a natural language form, the request identifying an alert to be provided in response to identification of a pattern over time in business event data that predicts, based at least in part on a regression of outcomes to the business event data, a risk metric, the risk metric associated with a key performance indicator of a plurality of key performance indicators identified in the request, the request further configuring a percentage range function for the key performance indicator, and the request further configuring range boundaries and the alert for the percentage range function for the key performance indicator;
  generating, by the continuous query service, a continuous query for at least the key performance indicator configured to query against a stream of the business event data associated with the user for at least the key performance indicator based at least in part on the tactical query and translated from the natural language form;
  generating a relation based at least in part on the stream of business event data that includes the pattern over time in the business event data;
  implementing at least one event sink configured to receive results of the continuous query;
  querying the relation using the continuous query to receive data corresponding to the pattern over time in business event data and the key performance indicator associated with the business event data;
  providing the data corresponding to the pattern over time in business event data and the key performance indicator to the at least one event sink;
  enabling output events of the continuous query, from the event sink, to be stored in a plurality of output tables, each output table of the plurality of output tables corresponding to a respective key performance indicator watch list user interface (UI) of a plurality of key performance indicator watch list user interfaces (UIs), each respective key performance indicator watch list UI configured to display real-time data of each respective key performance indicator;
  mapping each of the plurality of key performance indicator watch UIs to multiples of the plurality of key performance indicators;
  for each output event of the continuous query:
    determine affected key performance indicators;
    identify, based at least in part on the mapping, respective key performance indicator watch list UIs to be updated with the real-time data; and
    update an entry in each corresponding output table of the plurality of output tables;
  generating the alert, for a particular key performance indicator watch list UI, according to the updated entry in the corresponding output table being over a threshold corresponding to the affected key performance indicators;
  providing business intelligence information associated with the business event pattern over time from the event sink to a client device for presentation as part of the alert in a risk dashboard UI comprising a visualization of at least the particular key performance indicator watch list UI; and
  updating the particular key performance indicator watch list UI in the risk dashboard UI based at least in part on subsequent output events of the continuous query.

19. The computer-implemented method of claim 18, further comprising enabling the output of the continuous query to be stored in an output table, wherein the alert is provided to the user based at least in part on the output table.

20. The computer-implemented method of claim 19, wherein the output table is configured to accumulate at least one of an insert or a delete output received from the event sink of the continuous query service.

* * * * *

UNITED STATES PATENT AND TRADEMARK OFFICE
CERTIFICATE OF CORRECTION

PATENT NO. : 11,093,505 B2
APPLICATION NO. : 13/830378
DATED : August 17, 2021
INVENTOR(S) : Park et al.

Page 1 of 2

It is certified that error appears in the above-identified patent and that said Letters Patent is hereby corrected as shown below:

On the Title Page

On page 6, Column 2, item (56) under Other Publications, Line 11, delete "llg" and insert -- 11g --, therefor.

On page 6, Column 2, item (56) under Other Publications, Line 67, delete "PostgresSQL," and insert -- PostgreSQL, --, therefor.

On page 6, Column 2, item (56) under Other Publications, Line 67, delete "PostgresSQL" and insert -- PostgreSQL --, therefor.

On page 7, Column 1, item (56) under Other Publications, Line 10, delete "/httpl/" and insert -- /http:l/ --, therefor.

On page 7, Column 2, item (56) under Other Publications, Line 41, delete "Integrationand" and insert -- Integration and --, therefor.

On page 7, Column 2, item (56) under Other Publications, Line 44, delete "SqiDataSource" and insert -- SqlDataSource --, therefor.

On page 8, Column 1, item (56) under Other Publications, Line 41, delete "Serverver" and insert -- Server --, therefor.

On page 11, Column 1, item (56) under Other Publications, Line 25, delete "PostgresSQL," and insert -- PostgreSQL, --, therefor.

On page 11, Column 1, item (56) under Other Publications, Line 25, delete "PostgresSQL" and insert -- PostgreSQL --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,093,505 B2

On page 11, Column 1, item (56) under Other Publications, Line 37, delete "Retrievd" and insert -- Retrieved --, therefor.

On page 12, Column 1, item (56) under Other Publications, Line 39, delete "Actio" and insert -- Action --, therefor.

On page 13, Column 1, item (56) under Other Publications, Line 41, delete "Patentabiilty" and insert -- Patentability --, therefor.

On page 13, Column 2, item (56) under Other Publications, Line 43, delete "llg" and insert -- 11g --, therefor.

On page 13, Column 2, item (56) under Other Publications, Line 47, delete "LanguageReference" and insert -- Language Reference --, therefor.

On page 14, Column 1, item (56) under Other Publications, Line 10, before "2017," insert -- 10, --.

On page 14, Column 1, item (56) under Other Publications, Line 14, before "2017," insert -- 11, --.

In the Claims

In Column 32, Line 21, in Claim 13, after "watch" delete "lists".